United States Patent
Badura et al.

(10) Patent No.: US 12,539,220 B2
(45) Date of Patent: Feb. 3, 2026

(54) SYSTEMS AND METHODS FOR BONE GRAFT MIXTURE GUIDANCE BASED ON NAVIGATION INFORMATION

(71) Applicant: Medtronic Navigation, Inc., Lafayette, CO (US)

(72) Inventors: Jeffrey M. Badura, Collierville, TN (US); Daniel A. Shimko, Germantown, TN (US); Victor D. Snyder, Erie, CO (US); Jerald L. Redmond, Germantown, TN (US); Nikhil Mahendra, Broomfield, CO (US)

(73) Assignee: Medtronic Navigation, Inc., Lafayette, CO (US)

( * ) Notice: Subject to any disclaimer, the term of this patent is extended or adjusted under 35 U.S.C. 154(b) by 57 days.

(21) Appl. No.: 18/664,565

(22) Filed: May 15, 2024

(65) Prior Publication Data
US 2024/0398584 A1     Dec. 5, 2024

Related U.S. Application Data

(60) Provisional application No. 63/469,759, filed on May 30, 2023.

(51) Int. Cl.
*A61F 2/46* (2006.01)
*A61F 2/28* (2006.01)
(Continued)

(52) U.S. Cl.
CPC .......... *A61F 2/4644* (2013.01); *G06T 7/0012* (2013.01); *G06T 7/11* (2017.01);
(Continued)

(58) Field of Classification Search
CPC ............... A61B 34/10; A61F 2/4644; A61F 2002/2835; A61F 2002/4632;
(Continued)

(56) References Cited

U.S. PATENT DOCUMENTS

| | | |
|---|---|---|
| 2013/0094740 A1 | 4/2013 | Vandenberghe |
| 2014/0212471 A1 | 7/2014 | Drapeau et al. |

(Continued)

OTHER PUBLICATIONS

Fu et al. "The fusion rate of demineralized bone matrix compared with autogenous iliac bone graft for long multi-segment posterolateral spinal fusion," BMC Musculoskeletal Disorders, 2016, vol. 17, Article 3, 6 pages.
(Continued)

*Primary Examiner* — Jessica Weiss
(74) *Attorney, Agent, or Firm* — Sheridan Ross P.C.

(57) ABSTRACT

A method according to one embodiment includes: determining a volume of a harvested autograft, the determining including: receiving an image depicting an anatomical element, the image segmented into a plurality of voxels with each voxel of the plurality of voxels labeled with either a first bone volume label representing a first volume type or a second bone volume label representing a second volume type; and summing a first set of voxel values labeled as having the first volume type and through which an operative portion of a navigated tool passes to determine the volume of the harvested autograft; and determining a total volume of a bone graft for a surgical task, the determining including: identifying a portion of a patient eligible for the bone graft; and summing a second set of voxel values associated with the portion of the patient to determine the total volume of the bone graft.

23 Claims, 9 Drawing Sheets

(51) Int. Cl.
*G06T 7/00* (2017.01)
*G06T 7/11* (2017.01)
*G06T 7/20* (2017.01)
*G06T 7/62* (2017.01)
*G06V 10/22* (2022.01)
*G06V 10/82* (2022.01)
*G06V 20/70* (2022.01)

(52) U.S. Cl.
CPC ............... *G06T 7/20* (2013.01); *G06T 7/62* (2017.01); *G06V 10/22* (2022.01); *G06V 10/82* (2022.01); *G06V 20/70* (2022.01); *A61F 2002/2835* (2013.01); *A61F 2002/4632* (2013.01); *A61F 2002/4649* (2013.01); *A61F 2002/4663* (2013.01); *G06T 2207/20084* (2013.01); *G06T 2207/30008* (2013.01); *G06V 2201/033* (2022.01); *G06V 2201/034* (2022.01)

(58) Field of Classification Search
CPC ..... A61F 2002/4649; A61F 2002/4663; G06T 7/62; G06T 7/11; G06T 7/0012; G06T 7/20; G06V 20/70; G06V 10/22; G06V 10/82

USPC .......... 606/102, 86 R, 279; 623/17.11–17.16
See application file for complete search history.

(56) References Cited

U.S. PATENT DOCUMENTS

| | | |
|---|---|---|
| 2016/0114078 A1 | 4/2016 | Dawson et al. |
| 2016/0270920 A1 | 9/2016 | Dawson et al. |
| 2019/0021681 A1* | 1/2019 | Kohli .................... A61B 6/037 |
| 2019/0320878 A1 | 10/2019 | Duindam et al. |
| 2020/0069257 A1 | 3/2020 | Fleming et al. |
| 2022/0198665 A1 | 6/2022 | Mahendra et al. |
| 2022/0265358 A1* | 8/2022 | Claizergues ........... G16H 40/67 |

OTHER PUBLICATIONS

Steffen et al. "Posterolateral and Anterior Interbody Spinal Fusion Models in the Sheep," Clinical Orthopaedics and Related Research, Feb. 2000, vol. 371, pp. 28-37.

International Search Report and Written Opinion for International (PCT) Patent Application No. PCT/IB2024/055159, dated Aug. 13, 2024, 6 pages.

* cited by examiner

SYSTEMS AND METHODS FOR BONE GRAFT MIXTURE GUIDANCE BASED ON NAVIGATION INFORMATION

CROSS-REFERENCE TO RELATED APPLICATION

This application claims the benefit of and priority to U.S. Provisional Patent Application No. 63/469,759 filed May 30, 2023, the entire disclosure of which is incorporated by reference herein.

BACKGROUND

The present disclosure is generally directed to surgical navigation, and relates more particularly to bone grafts.

Surgical robots may assist a surgeon or other medical provider in carrying out a surgical procedure, or may complete one or more surgical procedures autonomously. Imaging may be used by a medical provider for diagnostic and/or therapeutic purposes. Patient anatomy can change over time, particularly following placement of a medical implant in the patient anatomy.

BRIEF SUMMARY

Example aspects of the present disclosure include:

A method according to at least one embodiment of the present disclosure comprises: determining a volume of a harvested autograft, the determining comprising: receiving an image depicting an anatomical element, the image segmented into a plurality of voxels with each voxel of the plurality of voxels labeled with either a first bone volume label representing a first volume type or a second bone volume label representing a second volume type; and summing a first set of voxel values labeled as having the first volume type and through which an operative portion of a navigated tool passes to determine the volume of the harvested autograft; and determining a total volume of a bone graft for a surgical task, the determining comprising: identifying a portion of a patient eligible for the bone graft; and summing a second set of voxel values associated with the portion of the patient to determine the total volume of the bone graft.

Any of the features herein, wherein the operative portion of the navigated tool comprises a surgical tip capable of resecting anatomical tissue from the anatomical element, and wherein the determining the volume of the harvested autograft further comprises: tracking a position of the surgical tip of the navigated tool.

Any of the features herein, further comprising: displaying a recommendation for a bone graft mixture, wherein the recommendation for the bone graft mixture is determined, at least in part, based on the volume of the harvested autograft and the total volume of the bone graft.

Any of the features herein, wherein the bone graft mixture comprises one or more of cancellous bone, cortical bone, bone marrow, demineralized bone matrix (DBM), autogenous iliac bone graft (AIBG), recombinant human bone morphogenetic protein-2 (rhBMP-2), and synthetic bone graft.

Any of the features herein, wherein the bone graft mixture is determined based at least partially on a surgeon preference and an estimated match to bone density at the portion of the patient eligible for the bone graft.

Any of the features herein, further comprising: capturing, after a bone graft mixture has been applied to the portion of the patient, a second image depicting at least one of the portion of the patient and the bone graft mixture.

Any of the features herein, wherein voxels of the plurality of voxels that comprise more than fifty percent cancellous bone are labeled as having high bone quality, and wherein voxels of the plurality of voxels that comprise more than fifty percent cortical bone are labeled as having low bone quality.

Any of the features herein, wherein at least one of the first set of voxel values and the second set of voxel values is determined based on Hounsfield units.

Any of the features herein, wherein a machine learning model at least one of segments the image and labels the voxels.

Any of the features herein, wherein the determining the total volume of the bone graft further comprises: segmenting a second image depicting the portion of the patient into a second plurality of voxels, wherein each voxel value of the second set of voxel values corresponds to a respective voxel of the second plurality of voxels.

A system according to at least one embodiment of the present disclosure comprises: a processor; and a memory storing data thereon that, when processed by the processor, enable the processor to: segment an image depicting an anatomical element into a plurality of voxels; label, based on input information, one or more voxels of the plurality of voxels as either having a first volume type or a second volume type; track an operative portion of a surgical tool as the operative portion interacts with the anatomical element; identify a first set of voxels of the plurality of voxels that have the first volume type and that interact with the operative portion; determine a voxel value associated with each voxel of the first set of voxels; and sum together the voxel values of the each voxel of the first set of voxels, the sum representing a volume of a harvested autograft.

Any of the features herein, wherein the data further enable the processor to: identify a region of a patient eligible for a bone graft; segment an image depicting the region into a second plurality of voxels; determine a voxel value associated with each voxel of the second plurality of voxels; and sum the voxel values of the each voxel of the second plurality of voxels, the sum representing a total volume of the bone graft.

Any of the features herein, wherein the data further enable the processor to: provide a recommendation for a bone graft mixture, wherein the recommendation for the bone graft mixture is determined, at least in part, based on the volume of the harvested autograft, a proportion of cortical to cancellous bone available, and the total volume of the bone graft.

Any of the features herein, wherein the recommended bone graft mixture comprises one or more of cancellous bone, cortical bone, bone marrow, demineralized bone matrix (DBM), autogenous iliac bone graft (AIBG), recombinant human bone morphogenetic protein-2 (rhBMP-2), and synthetic bone graft.

Any of the features herein, wherein the recommended bone graft mixture is based on at least one of surgeon preference information retrieved from a database and a parameter associated with the patient.

Any of the features herein, wherein the data further enable the processor to: capture, after a bone graft mixture has been applied to the portion of the patient, a second image depicting the portion of the patient.

Any of the features herein, wherein each voxel value of at least one of the first set of voxels and the second plurality of voxels are determined based on Hounsfield units.

Any of the features herein, wherein the input information comprises at least one of an output of a machine learning model that labels the each voxel of the plurality of voxels and a user input.

Any of the features herein, wherein the machine learning model comprises a convolutional neural network.

A surgical system according to at least one embodiment of the present disclosure comprises: a surgical tool with an operative portion capable of resecting anatomical tissue; a processor; and a memory storing data thereon that, when processed by the processor, enable the processor to: determine a volume of a harvested autograft of an anatomical element, the determining comprising: segmenting a first image depicting the anatomical element into a plurality of voxels; labeling each voxel of the plurality of voxels as either having a first volume type or a second volume type; identifying a first set of voxels, wherein each voxel of the first set of voxels is labeled as having the first volume type and has been occupied by the operative portion of the surgical tool; determining a volume of each voxel of the first set of voxels; and summing the volume of each voxel of the first set of voxels together to determine the volume of the harvested autograft; determine a total volume of a bone graft for a surgical task, the determining comprising: identifying, based on a second image of a patient, a region of the patient eligible for the bone graft; and summing voxel values in the region of the patient to determine the total volume of the bone graft needed; and display a recommendation for a bone graft mixture, wherein the recommendation for the bone graft mixture is determined, at least in part, based on a combination of the volume of the harvested autograft, a proportion of cortical to cancellous bone available, and the total volume of the bone graft needed.

Any of the features herein, wherein a quantity of the recommended bone graft mixture is determined based on a difference between the total volume of the bone graft needed and the volume of the harvested autograft.

Any of the features herein, wherein a quantity of the recommended bone graft mixture is determined based on a difference between the total volume of the bone graft for the surgical task and the volume of the harvested autograft.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present disclosure will become apparent to those skilled in the art upon consideration of the embodiment descriptions provided hereinbelow.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
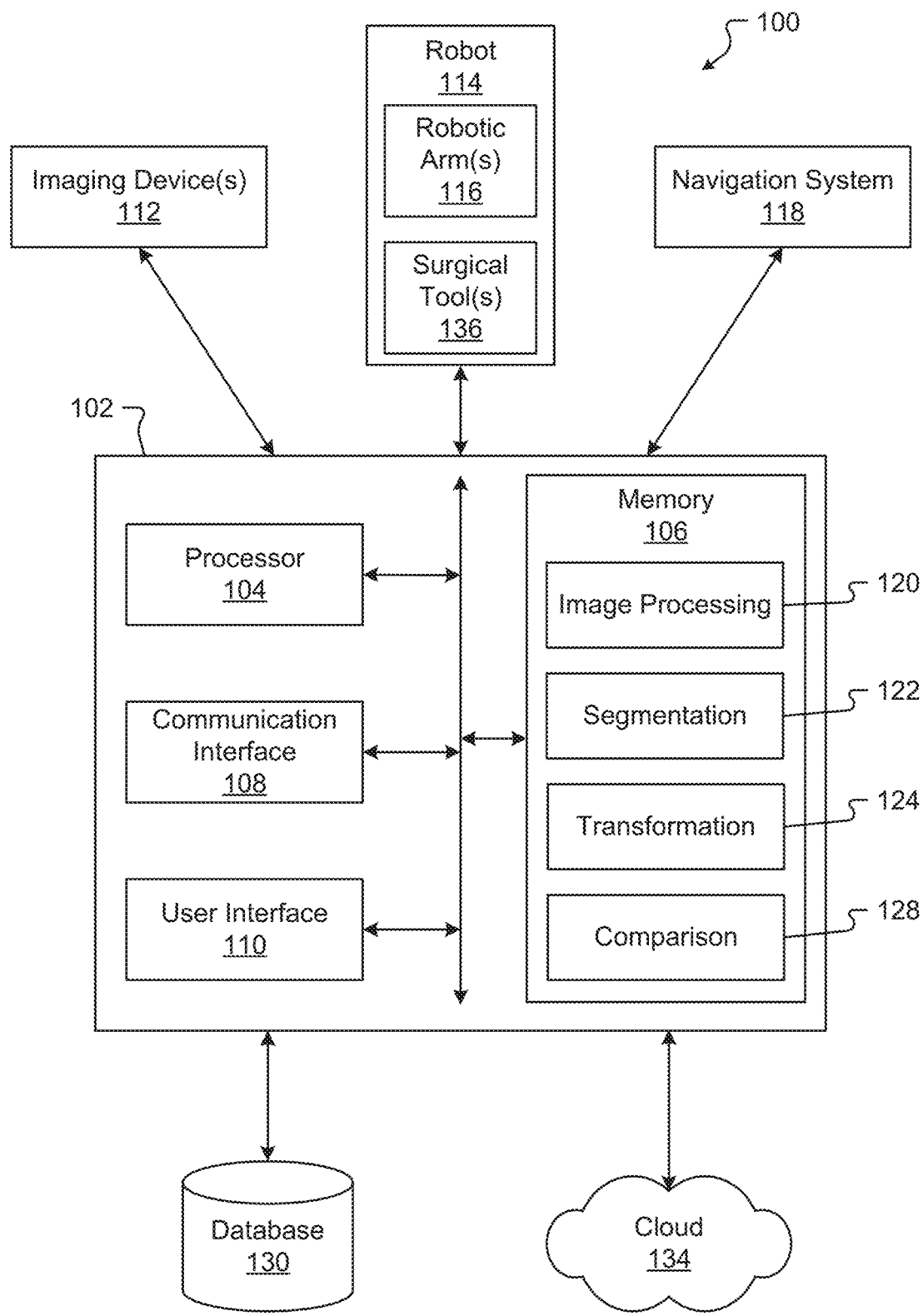
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10× Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The terms proximal and distal are used in this disclosure with their conventional medical meanings, proximal being closer to the operator or user of the system, and further from the region of surgical interest in or on the patient, and distal being closer to the region of surgical interest in or on the patient, and further from the operator or user of the system.

Spinal fusion surgeries may utilize bone graft to bridge two vertebral segments in the spine. Bone graft can be placed in between the vertebral bodies after the intervertebral disc has been removed and the endplates prepared. Bone graft can also be placed in the posterior section of vertebrae such as lamina, facets, or along transverse processes for obtaining posterolateral fusion. Surgeons prepare the vertebra and/or posterior sections of native bony anatomy for fusion by first decorticating regions like the vertebral endplates facets, or transverse processes. Decortication results in bleeding bony surfaces and commonly stimulates a localized bony healing response. Bone graft is placed in direct apposition to this bleeding bone to increase the bleeding bone's participation in bony fusion and integration with the native bony anatomy.

According to at least one embodiment of the present disclosure, a system may use navigation data and a knowledge of the surgical workflow to measure the volume of harvested autograft, measure the total volume of bone graft required for a surgical task, and suggest, based upon the measured volume and the measured total volume, an optimal bone graft mixture.

In some embodiments, the volume of each voxel in the exam that is identified as bone and that is at any point occupied by a relevant portion of a relevant navigated tool is added to the maximum possible total volume of harvested autograft. The system may implement various methods in identifying voxels as being associated with bone. Automatic image segmentation (as by a convolutional neural network or other machine learning model) may label a voxel as part of a facet, and thus bony, while voxels in adipose tissue on the approach trajectory are flagged as non-bony. A clinician may manually modify any automatic algorithm's results, or may define the regions entirely manually, as by "painting" on exam slices, constructing virtual boxes or other shapes in regions of interest, or any other established method of manual or semiautomatic image segmentation.

In some embodiments, based on an internal database of tool description information, the system considers different parts of each navigated tool when deciding whether or not a voxel identified as bone has been harvested. For example, when the surgeon explores with a navigated pointer probe, the system understands that the pointer probe does not remove any tissue, so no voxel occupied by any part of the probe is considered harvested. The burr of a navigated drill (e.g., Stealth-Midas™) is known to the system to remove bone, while the attachment and motor do not remove bone.

Therefore, any bony voxel occupied by the burr is considered harvested. A navigated osteotome's blade width and trajectory when docked on bone define a cutting plane, and the system expects the smaller of the connected components separated by that plane to be harvested.

In some embodiments, scans taken before tissue has been removed and after (though still intraoperatively) may be compared to determine what volume of autograft may be available. Relevant portions of the scan may be identified automatically, semiautomatically, or manually. Regardless of whether the measurement of the autograft is based on navigation or imaging, the total volume of the harvested bone voxels gives the maximal amount of autograft available from the surgical site. Based on information (e.g., research, relevant literature, surgeon preference, etc.), the system may then compute a fraction of that maximal amount as the amount actually available for use. This amount may be presented to the surgeon (e.g., the information may be rendered to a display) or used in downstream calculations.

In some embodiments, the system may determine the total volume of required bone graft using similar methods to those discussed above with respect to measuring the autograft. In this case, the exam is segmented to identify regions eligible for bone graft. For example, voxels in the disc space or within some margin around the facets' posterior surfaces are identified as eligible for graft, while voxels corresponding to soft tissue on the surgical approach are not. In some embodiments, automatic, semiautomatic, or manual image segmentation may be applied in any combination to identify the voxels.

In some embodiments, navigation allows measurement of the defect volume. For example, the system understands that the navigated drill's burr removes bone, so when voxels on the posterior cortical aspect of the facet (and thus previously identified as eligible for graft placement) are occupied by the burr, the system adds the volumes of those voxels to the total amount of bone graft needed. As another example, when the surgeon uses a navigated pull curette to remove disc material, only those voxels that are in the disc space (and thus previously identified as eligible for graft placement) and that are occupied by the cupped working end of the tool are considered, while voxels that interact with the tool's shaft do not contribute to the total required bone graft volume. Additionally or alternatively, scans taken before tissue has been removed and after (though still intraoperatively) may be compared to determine what total volume is required for the autograft. The total volume may be modified by a factor according to surgeon preference, and the final measurement may be presented to the surgeon (e.g., the information may be rendered to a display) or used in downstream calculations.

In some embodiments, having determined the total volume of available autograft and total volume of bone graft required, the system may then calculate how much biologic is required and/or how much additional bone must be harvested from other sites (e.g., the iliac crest). Precise and accurate knowledge of the amount of autograft available as compared to the total volume of bone graft required may enable development of optimized mixtures that are more effective and make a more efficient use of growth factors for a given defect volume or fusion application. Some examples of graft mixture recommendations for 50 mm$^3$ as compared to 100 mm$^3$ decortication and potential graft options based on application and regulator permissibility may include: a local autograft and synthetic bone graft in a 50:50 mix, local autograft and demineralized bone matrix (DBM) in a 50:50 mix or a 40:60 mix, 15 milliliters (mL) local autograft or 10 mL autogenous iliac bone graft (AIBG) with 5 mL DBM, or rhBMP-2 dosage recommendation (e.g., 1 milligrams (mg), 2 mg, etc.) based on the volume of Infuse (rhBMP-2/ACS sponges) required to fill the defect of interest.

Embodiments of the present disclosure provide technical solutions to one or more of the problems of (1) inaccurate autograft measurements or unknown quantity of autograft, (2) inaccurate bone graft measurements or unknown quantity of required bone graft, and (3) inaccurate bone graft mixtures.

Turning first to FIG. 1, a block diagram of a system 100 according to at least one embodiment of the present disclosure is shown. The system 100 may be used to navigate surgical tools and/or image anatomical elements during surgical procedures to determine autograft harvest quantity and bone graft requirements; to provide guidance on optimal bone graft mixtures; to control, pose, and/or otherwise manipulate a surgical mount system, a surgical arm, and/or surgical tools attached thereto; and/or carry out one or more other aspects of one or more of the methods disclosed herein. The system 100 comprises a computing device 102, one or more imaging devices 112, a robot 114, a navigation system 118, a database 130, and/or a cloud or other network 134. Systems according to other embodiments of the present disclosure may comprise more or fewer components than the system 100. For example, the system 100 may not include one or more components of the computing device 102, the database 130, and/or the cloud 134.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 114, the navigation system 118, the database 130, and/or the cloud 134.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the methods 400 and/or 500 described herein, or of any other methods. The memory 106 may store, for example, instructions and/or machine learning models that support one or more functions of the robot 114. For instance, the memory 106 may store content (e.g., instructions and/or machine learning models) that, when executed by the processor 104, enable image processing 120, segmentation 122, transformation 124, and/or comparison 128. Such content, if provided as in instruction, may, in some embodiments, be organized into one or more applications, modules, packages, layers, or engines. Alternatively or additionally, the memory 106 may store other types of content or data (e.g., machine learning models, artificial neural networks, deep neural networks, etc.) that can be processed by the processor 104 to carry out the various method and features described herein. Thus, although various contents of memory 106 may be described as instructions, it should be appreciated that functionality described herein can be achieved through use of instructions, algorithms, and/or machine learning models. The data, algorithms, and/or instructions may cause the processor 104 to manipulate data stored in the memory 106 and/or received from or via the imaging device 112, the robot 114, the database 130, and/or the cloud 134.

The computing device 102 may also comprise a communication interface 108. The communication interface 108 may be used for receiving image data or other information from an external source (such as the imaging device 112, the robot 114, the navigation system 118, the database 130, the cloud 134, and/or any other system or component not part of the system 100), and/or for transmitting instructions, images, or other information to an external system or device (e.g., another computing device 102, the imaging device 112, the robot 114, the navigation system 118, the database 130, the cloud 134, and/or any other system or component not part of the system 100). The communication interface 108 may comprise one or more wired interfaces (e.g., a USB port, an Ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computer device 102.

The imaging device 112 may be operable to image anatomical feature(s) (e.g., a bone, veins, tissue, etc.) and/or other aspects of patient anatomy to yield image data (e.g., image data depicting or corresponding to a bone, veins, tissue, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or comprise, for example, an ultrasound scanner (which may comprise, for example, a physically separate transducer and receiver, or a single ultrasound transceiver), an O-arm, a C-arm, a G-arm, or any other device utilizing X-ray-based imaging (e.g., a fluoroscope, a CT scanner, or other X-ray machine), a magnetic resonance imaging (MRI) scanner, an optical coherence tomography (OCT) scanner, an endoscope, a microscope, an optical camera, a thermographic camera (e.g., an infrared camera), a radar system (which may comprise, for example, a transmitter, a receiver, a processor, and one or more antennae), or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may comprise more than one imaging device 112. For example, a first imaging device may provide first image data and/or a first image, and a second imaging device may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or comprise, for example, the Mazor X™ Stealth Edition robotic guidance system. The robot 114 may be configured to position the imaging device 112 at one or more precise position(s) and orientation(s), and/or to return the imaging device 112 to the same position(s) and orientation(s) at a later point in time. The robot 114 may additionally or alternatively be configured to manipulate a surgical tool (whether based on guidance from the navigation system 118 or not) to accomplish or to assist with a surgical task. In some embodiments, the robot 114 may be configured to hold and/or manipulate an anatomical element during or in connection with a surgical procedure. The robot 114 may comprise one or more robotic arms 116. In some embodiments, the robotic arm 116 may comprise a first robotic arm and a second robotic arm, though the robot 114 may comprise more than two robotic arms. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Each robotic arm 116 may be positionable independently of the other robotic arm. The robotic arms 116 may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may comprise one or more sensors that enable the processor 104 (or a processor of the robot 114) to determine a precise pose in space of the robotic arm 116 (as well as any object or element held by or secured to the robotic arm 116).

In some embodiments, reference markers (e.g., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system 118 may comprise one or more electromagnetic sensors. In various embodiments, the navigation system 118 may be used to track a position and orientation (e.g., a pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The database 130 may store information that correlates one coordinate system to another (e.g., one or more robotic coordinate systems to a patient coordinate system and/or to a navigation coordinate system). The database 130 may additionally or alternatively store, for example, one or more surgical plans (including, for example, pose information about a target and/or image information about a patient's anatomy at and/or proximate the surgical site, for use by the robot 114, the navigation system 118, and/or a user of the computing device 102 or of the system 100); one or more images useful in connection with a surgery to be completed by or with the assistance of one or more other components of the system 100; and/or any other useful information. The database 130 may be configured to provide any such information to the computing device 102 or to any other device of the system 100 or external to the system 100, whether directly or via the cloud 134. In some embodiments, the database 130 may be or comprise part of a hospital image storage system, such as a picture archiving and communication system (PACS), a health information system (HIS), and/or another system for collecting, storing, managing, and/or transmitting electronic medical records including image data.

The cloud 134 may be or represent the Internet or any other wide area network. The computing device 102 may be connected to the cloud 134 via the communication interface 108, using a wired connection, a wireless connection, or both. In some embodiments, the computing device 102 may communicate with the database 130 and/or an external device (e.g., a computing device) via the cloud 134.

The system 100 comprises a surgical tool 136. The surgical tool 136 may be configured to drill, burr, mill, cut, saw, ream, tap, etc. into anatomical tissues such as patient anatomy (e.g., soft tissues, bone, etc.). In some embodiments, the system 100 may comprise multiple surgical tools, with each surgical tool performing a different surgical task (e.g., a surgical drill for drilling, a surgical mill for milling, a curette for removing anatomical tissue, an osteotome for cutting bone, etc.). In other embodiments, the surgical tool 136 may provide an adapter interface to which different working ends can be attached to perform multiple different types of surgical maneuvers (e.g., the surgical tool 136 may be able to receive one or more different tool bits, such that the surgical tool 136 can drill, mill, cut, saw, ream, tap, etc. depending on the tool bit coupled with the surgical tool 136). The surgical tool 136 may be operated autonomously or semi-autonomously.

In some embodiments, the surgical tool 136 may be attached to a robotic arm 116, such that movement of the robotic arm 116 correspondingly causes movement in the surgical tool 136. In other words, the surgical tool 136 may be gripped, held, or otherwise coupled to and controlled by the robotic arm 116. As such, the pose (e.g., position and orientation) of the surgical tool 136 may be controlled by the pose of the robotic arm 116. The surgical tool 136 can be controlled by one or more components of the system 100, such as the computing device 102. In some embodiments, the computing device 102 may be capable of receiving or retrieving data or other information (e.g., from the database 130, from one or more sensors, from the imaging device 112, etc.), process the information, and control the surgical tool 136 based on the processed information. Additionally or alternatively, the navigation system 118 may track the position of and/or navigate the surgical tool 136. Such tracking may enable the system 100 or components thereof (e.g., the computing device 102) to determine an amount of autograft harvested from a surgery or surgical procedure, a total volume of autograft required to perform a surgical procedure, and/or recommend a bone graft mixture as discussed in further detail below.

The system 100 or similar systems may be used, for example, to carry out one or more aspects of any of the methods 400 and/or 500 described herein. The system 100 or similar systems may also be used for other purposes.

Figure 2A:
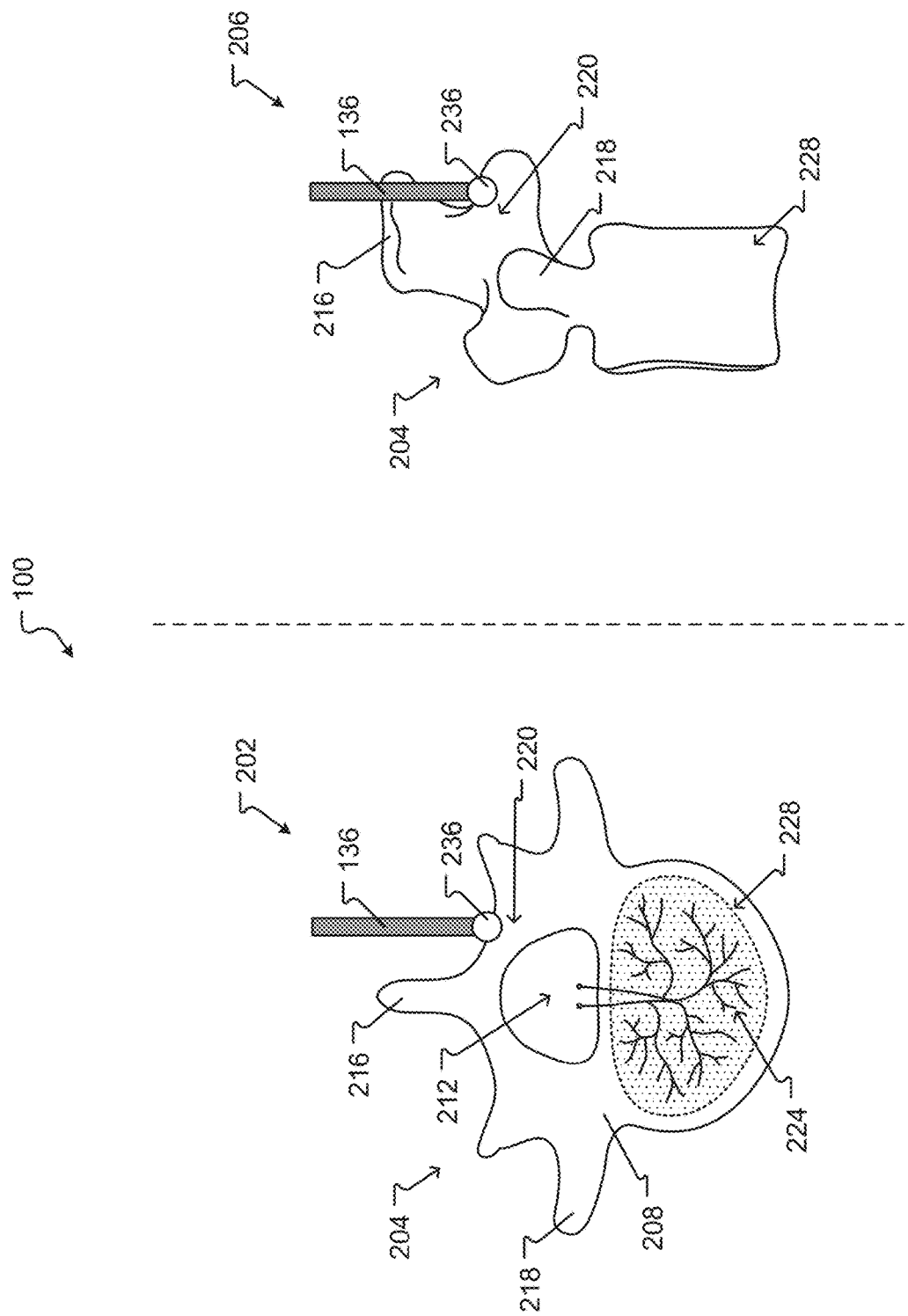
FIG. 2A is a diagram of a surgical tool positioned proximate an anatomical element according to at least one embodiment of the present disclosure.
Figure 2B:
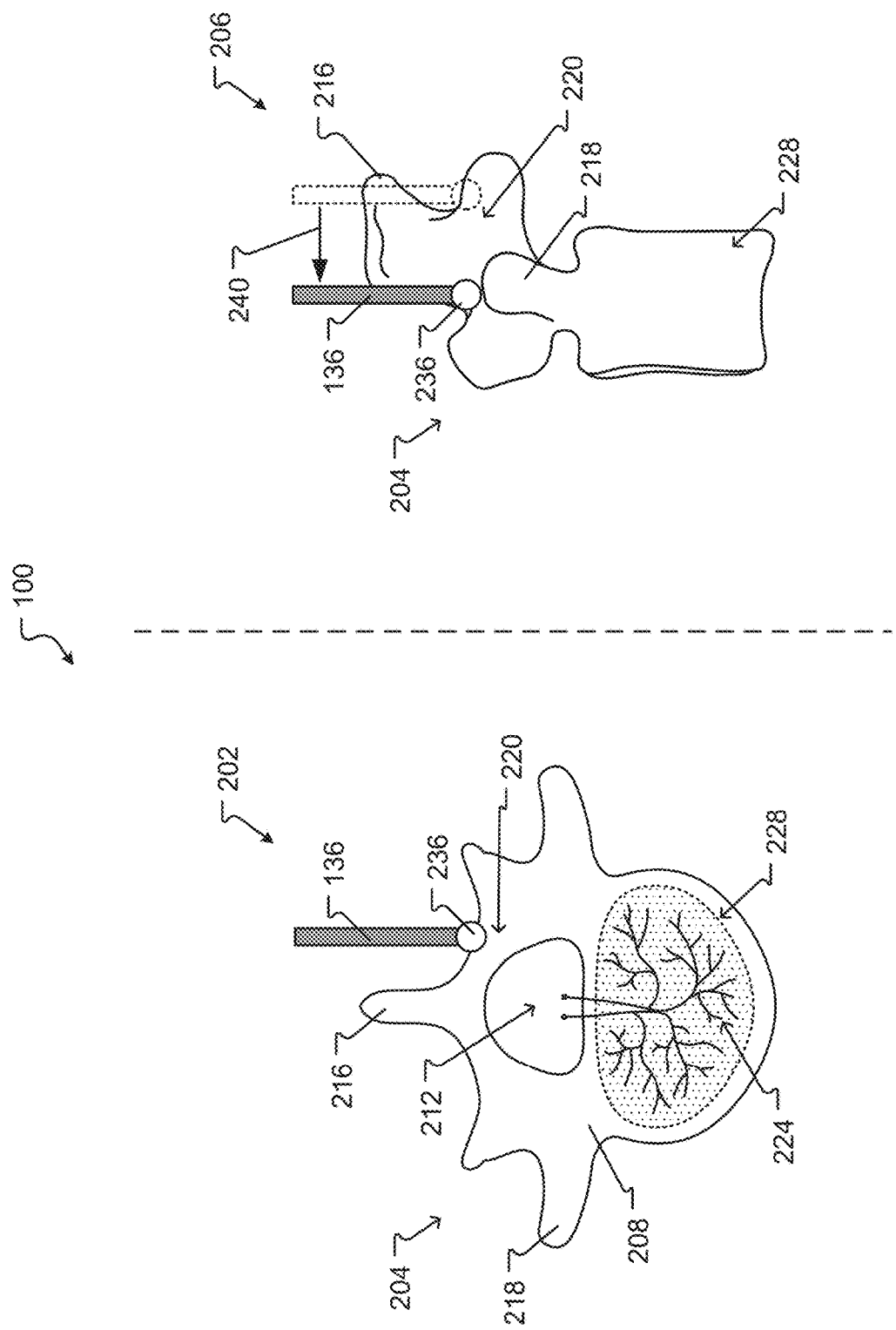
FIG. 2B is a diagram of a surgical tool moving relative to the anatomical element according to at least one embodiment of the present disclosure.
Figure 2C:
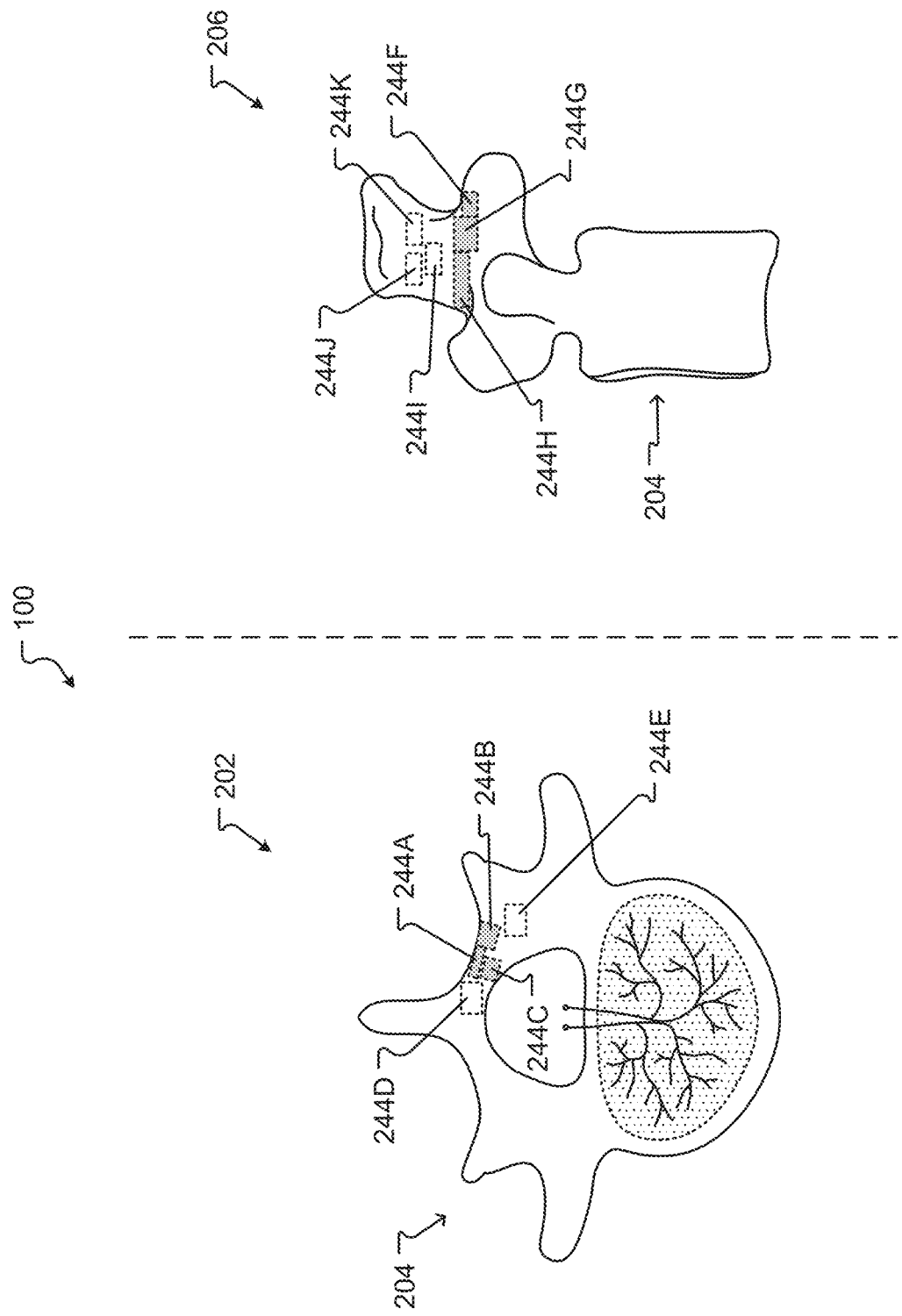
FIG. 2C is a diagram of segmented voxels of the anatomical element according to at least one embodiment of the present disclosure.

FIGS. 2A-2C depict aspects of a surgical tool 136 moving relative to a vertebra 204 according to at least one embodiment of the present disclosure. The movement of the surgical tool 136 relative to the vertebra 204 may occur when the surgery or surgical procedure comprises, for example, harvesting an autograft. The autograft may be used in some cases by a user (e.g., a surgeon) during the course of a spinal fusion surgery. It is to be understood that, while a vertebra 204 is depicted, in some examples the surgical tool 136 may interact with any other anatomical element (e.g., any other bone in the patient). The vertebra 204 comprises at least one pedicle 208, a vertebral foramen 212, a spinous process 216, a transverse process 218, lamina 220, nerves 224, and a vertebral body area 228.

With reference to FIGS. 2A-2C each depict a superior view 202 and a lateral view 206 of the vertebra 204. The superior view 202 may depict the vertebra 204 from the top of the patient (e.g., viewing the vertebra 204 while looking down on the patient's head), while the lateral view 206 may depict the vertebra 204 from a side of the patient (e.g., from the patient's right-hand side or from the patient's left-hand side).

Turning to FIG. 2A, a tool tip 236 of the surgical tool 136 is placed on or proximate to the vertebra 204. The tool tip 236 may be placed on any one or more portions of the outside surface of the vertebra 204, such as the at least one pedicle 208, the lamina 220, the spinous process 216, the transverse process 218, or the like. In some embodiments, the tool tip 236 may be placed elsewhere depending on the type of surgical tool or tool tip used, the type of surgery or surgical procedure, surgeon preference, combinations thereof, and the like. For example, when the surgical tool 136 comprises a curette to remove disc material, the tool tip 236 of the curette may be placed within or proximate an intervertebral disc disposed between the vertebra 204 and another vertebra. In one embodiment, the tool tip 236 may be placed on the lamina 220 of the vertebra 204.

The tool tip 236 may be or comprise an operational portion of the surgical tool 136 such as a drill, saw, cutter, reamer, burr, or the like that enables the surgical tool to interact with the vertebra 204. For example, the surgical tool 136 may be or comprise a drill capable of drilling through bone, and the tool tip 236 comprises the surgical tip of the drill that can decorticate or resect anatomical tissue from the lamina 220 or facet of the vertebra 204. In another example, the surgical tool 136 may be or comprise an osteotome capable of cutting bone, and the tool tip 236 can decorticate or resect anatomical tissue from the lamina 220 or facet of the vertebra 204. In yet another example, the surgical tool 136 may be or comprise a curette for removing disc material, and the tool tip 236 includes a scoop or cupped working end capable of removing disc material from an intervertebral disc.

Information about the surgical tool 136 and/or the tool tip 236 may be stored in the database 130 and may be accessed during the course of the surgery or surgical procedure. The information may comprise information about the type, dimensions, and/or operating parameters of surgical tool 136 and/or the tool tip 236; information about whether or not the surgical tool 136 and/or the tool tip 236 is designed to decorticate or resect anatomical tissue; combinations thereof; and the like. Such information may be used, for example, by the navigation system 118 when tracking the surgical tool 136 to determine the locations on the vertebra 204 that interact with the surgical tool 136 and/or the tool tip 236. Based on the information about the surgical tool 136 and/or the tool tip 236 and information related to the navigation tracking of the surgical tool 136 and/or the tool tip 236 by the navigation system 118, the system 100 may be able to determine (e.g., using a processor 104) an amount of autograft harvested, a required amount of bone graft required for completing a surgical task, and/or an optimal bone graft mixture, as discussed in further detail below.

Turning to FIG. 2B, aspects of the surgical tool 136 and the tool tip 236 moving across the vertebra 204 are shown in accordance with at least one embodiment of the present disclosure. The surgical tool 136 and the tool tip 236 may move across the vertebra 204 for the purposes of carrying out a surgical task performed during a surgery or surgical procedure. For example, the surgical tool 136 may comprise a drill, and the movement of the surgical tool 136 and the tool tip 236 across the vertebra 204 may occur when the surgical tool 136 is being used to resect anatomical tissues (e.g., bone) the vertebra 204, such as when a surgeon is gathering autograft to be used in a spinal fusion procedure. While FIG. 2B depicts the tool tip 236 moving across the lamina 220 of the vertebra 204 in the direction of the arrow 240, it is to be understood that more generally the surgical tool 136 and/or the tool tip 236 may move across and/or interact with one or more other portions of the vertebra 204. For example, the surgical tool 136 and/or the tool tip 236 may interact with one or more facet joints of the vertebra 204, one or more spinous processes of the vertebra 204, one or more laminae of the vertebra 204, combinations thereof, and/or the like. Additionally or alternatively, the surgical tool 136 and/or the tool tip 236 may move across or interact with other vertebra or anatomical elements proximate the vertebra 204.

The navigation system 118 may track the position of the surgical tool 136 and/or the tool tip 236 as the surgical tool 136 and the tool tip 236 interact with the vertebra 204. The navigation system 118 may use localizers (e.g., components that localize the location of the patient, the vertebra 204, the imaging device 112, etc. in a known coordinate space) and the imaging device 112 to track the position of the surgical tool 136 and/or the tool tip 236. In some embodiments, the surgical tool 136 may comprise navigation markers that can be tracked by the navigation system 118. In some embodiments, the tracking of the surgical tool 136 and/or the tool tip 236 may be rendered to a display (e.g., user interface 110) for the user to view.

FIG. 2C depicts the vertebra 204 segmented into a first set of voxels 244A-244N according to at least one embodiment of the present disclosure. Each voxel of the first set of voxels 244A-244N may be sections of an image depicting the vertebra 204 that represents a 3D volume of the vertebra 204 at that point in space. In other words, the image of the vertebra 204 may be segmented into the first set of voxels 244A-244N, with each voxel of the first set of voxels 244A-244N representing a portion of the vertebra 204 in 3D space (or, in some cases, in 2D space). In some embodiments, the first set of voxels 244A-244N may cover the entirety of the image, while in other embodiments a portion of the image of the vertebra 204 may be segmented into voxels.

Each of the voxels includes an attenuation value. The attenuation value may reflect a propensity of the area (or volume) represented by the voxel to be penetrated by energy (e.g., radiation from an X-ray). In some embodiments, the attenuation value may be based on Hounsfield units (HU). Hounsfield units are dimensionless units universally used in CT scanning to express CT numbers in a standardized and convenient form. Hounsfield units are obtained from a linear transformation of measured attenuation coefficients. The transformations are based on the arbitrarily-assigned densities of air and pure water. For example, the radiodensity of distilled water at a standard temperature and pressure (STP) of zero degrees Celsius and 105 pascals is 0 HU; the radiodensity of air at STP is −1000 HU. While attenuation values of the voxel are discussed qualitatively (e.g., low attenuation, medium attenuation, high attenuation, etc.) and/or quantitatively (e.g., based on values in HU) herein, it is to be understood that that the values of the voxels discussed herein are in no way limiting.

Images of the vertebra 204 (e.g., an image depicting the superior view 202, an image depicting the lateral view 206, etc.) may be captured and segmented into the first set of voxels 244A-244N. In some embodiments, the segmenting may be performed manually, with the user providing input (e.g., via the user interface 110) to create the first set of voxels 244A-244N. Additionally or alternatively, the segmenting may be performed by the processor 104 using, for example, segmentation 122. The segmentation 122 may comprise one or more Artificial Intelligence (AI) and/or Machine Learning (ML) models (e.g., Convolutional Neural Networks (CNNs), Deep Neural Networks (DNNs), etc.) trained on data sets to segment an image of the vertebra 204 into the first set of voxels 244A-244N. For example, the segmentation 122 data model(s) may be trained on historical data sets of similar anatomical elements and/or similar surgeries or surgical procedures to identify one or more regions of interest and superimpose the first set of voxels 244A-244N on the image of the vertebra 204. In some embodiments, the segmentation 122 may be semiautomatic, with the user capable of modifying the results of the segmentation 122 manually. In other words, the segmentation 122 may segment the image of the vertebra 204, and the user may be able to adjust the segments, the position of one or more voxels of the second set of voxels 312A-312N, combinations thereof, and the like manually via input into the user interface 110.

The segmentation 122 comprises labeling each voxel of the first set of voxels 244A-244N as either having a first volume type or a second volume type. For example, voxels representing portions of the vertebra 204 such as a facet (e.g., the lamina 220, the spinous process 216, the transverse process 218, etc.) may be labeled as having the first volume type. Voxels representing portions of adipose tissue (e.g., tissue along the approach trajectory of the tool tip 236 to the vertebra 204) may in contrast may be labeled as having the second volume type. In such examples, the voxels with the first volume type may represent volumes of anatomical tissue that comprise bone, while the voxels with the second volume type may represent volumes of anatomical tissue that comprise non-bony tissue (e.g., fat). In some embodiments, the voxels may be labeled based on the attenuation values of the voxels. For example, bone has a greater attenuation value than fat due to the higher density of bone, so voxels that represent areas with high attenuation values (e.g., values above a predetermined threshold value stored in the database 130) may be labeled as having the first volume type, while voxels that represent areas with low attenuation values (e.g., values below the predetermined threshold value) may be labeled as having the second volume type. Additionally or alternatively, cortical bone may have a greater bone density than cancellous/trabecular bone, so voxels that represent areas of the vertebra 204 with a greater amount of cortical bone (and thus appear with higher attenuation values) may be labeled as having the first volume type, while voxels that represent areas of the vertebra 204 with a greater amount of cancellous/trabecular bone (and thus appear with lower attenuation values) may be labeled as having the second volume type. In these embodiments, voxels representing portions of adipose tissue or other non-bone anatomical tissues may be labeled as having a third volume type, with such third volume type indicating that the voxels have a lower attenuation value than voxels representing areas of the vertebra 204 with cortical bone and/or cancellous/trabecular bone.

Based on the tracking and the segmenting, the computing device 102 or components thereof (e.g., the processor 104) may determine which voxels of the first set of voxels 244A-244N were occupied by the tool tip 236 when the tool tip 236 moved across the vertebra 204. For example, if the tool tip 236 moved across the lamina 220 in the direction of the arrow 240, the computing device 102 would determine that a first voxel 244A, a second voxel 244B, a third voxel 244C, a sixth voxel 244F, a seventh voxel 244G, and an eighth voxel 244H were all occupied by the tool tip 236. Additionally or alternatively, the computing device 102 may identify voxels of the first set of voxels 244A-244N that were not occupied by or did not otherwise interact with the tool tip 236. For example, the computing device 102 may determine that a fourth voxel 244D, a fifth voxel 244E, a ninth voxel 244I, a tenth voxel 244J, and an eleventh voxel 244K did not interact with the tool tip 236.

The computing device 102 may determine which voxels should be considered harvested. This determination may be made, for example, when the tool tip 236 interacts with the vertebra 204 for the purposes of harvesting autograft. The determination of which voxels should be considered harvested may depend on the type of surgical tool 136 that was used and tracked by the navigation system 118. For example, when the surgical tool 136 comprises a pointer probe such as a navigated probe that is moved by the physician or other user when probing the vertebra 204, the computing device 102 may determine that no tissue has been removed, and may not consider the voxels through which the pointer probe has moved as being harvested. However, when the surgical tool 136 comprises a tool that resects or is capable of resecting anatomical tissue (e.g., a navigated drill), the computing device 102 may count the voxel through which the tool tip 236 passes as being harvested. In some embodiments, the computing device 102 may count those voxels with the first volume type through which the tool tip 236 as being harvested, while not counting voxels with the second volume type. In other words, the computing device 102 may not count voxels that have little or no bone content toward the total volume of the autograft harvested. For example, the first voxel 244A, the second voxel 244B, the third voxel 244C, the sixth voxel 244F, the seventh voxel 244G, and the eighth voxel 244H may all be identified as voxels that have interacted with the tool tip 236, but the first voxel 244A and the sixth voxel 244F were identified as being the second volume type. In such examples, the first voxel 244A and the sixth voxel 244F would not be considered when determining an amount of harvested autograft.

In another example, the surgical tool 136 may comprise an osteotome, in which case the tool tip 236 may be or comprise a blade. The computing device 102 may use information associated with the blade (e.g., the trajectory of the blade with respect to the vertebra 204, the width of the blade, etc.) when the blade is docked on the vertebra 204 to define a cutting plane. The computing device 102 may then define the smaller of the connected components separated by the plane to be harvested. In other words, the computing device 102 may expect that the volume of bone removed is smaller than the volume of the vertebra 204, and may identify the smaller voxel volume as being harvested.

In some embodiments, the computing device 102 may receive an image captured after the autograft has been harvested, and may use the captured image to determine an amount of autograft harvested from the surgical procedure. The imaging device 112 may capture an image of the vertebra 204 after the tool tip 236 has interacted with the vertebra 204, and the computing device 102 may then use comparison 128 to compare the shape of the vertebra 204 (e.g., a border, an outline, etc.) before the surgical tool 136 has operated on the vertebra 204 with the shape of the vertebra 204 after the autograft has been harvested. The comparison 128 may include registering or otherwise overlaying the images of the vertebra 204 and identifying voxels associated with the volume of anatomical tissue removed by the surgical tool 136. In some embodiments, the comparison 128 may be performed manually, with the providing input (e.g., via the user interface 110) to identify the portion of the vertebra 204 that has been removed by the surgical tool 136. Additionally or alternatively, the segmenting may be performed by the processor 104 using one or more AI and/or ML data models. For example, the processor 104 may access one or more data models (e.g., CNNs, DNNs, etc.) trained on data sets and that compare the images of the vertebra 204 and identify the volume of the vertebra 204 removed by the surgical tool 136. The one or more data models may be trained on historical data sets of similar anatomical elements and/or similar surgeries or surgical procedures. In some embodiments, the comparison may be semiautomatic, with the user capable of modifying the results of the comparison 128 manually. Stated differently, the comparison 128 may identify the volume removed by the surgical tool 136, and the user may be able to adjust the volume determination manually via input into the user interface 110.

The computing device 102 may determine an amount of autograft harvested by summing the voxels values of the voxels identified as harvested. Each voxel identified as harvested may have a corresponding volume value associated therewith, and the sum of the corresponding voxels may correspond to the total volume of the autograft harvested. In some embodiments, the computing device 102 may determine a fraction or percentage of the total volume as an actual amount available for use. The fraction or percentage of the total volume may account for potential errors in segmenting, volume estimation, tracking, and the like. In some embodiments, the fraction or percentage may be based on information retrieved from the database 130, and may be based on information about surgeon preference, information about relative autograft harvests in other clinical or surgical context (e.g., research on autograft harvest quantities or efficiencies), combinations thereof, and the like.

In some embodiments, information from the computing device 102 about which voxels correspond to regions of the vertebra 204 that have interacted with the tool tip 236, information about which voxels comprise the first volume type and/or the second volume type, and/or information about the total volume of autograft available for use may be rendered to a display such as the user interface 110 for the user (e.g., the surgeon) to see. The information may be used in determining an optimal bone graft mixture to use in a surgical procedure, as discussed in further detail below.

Figure 3A:
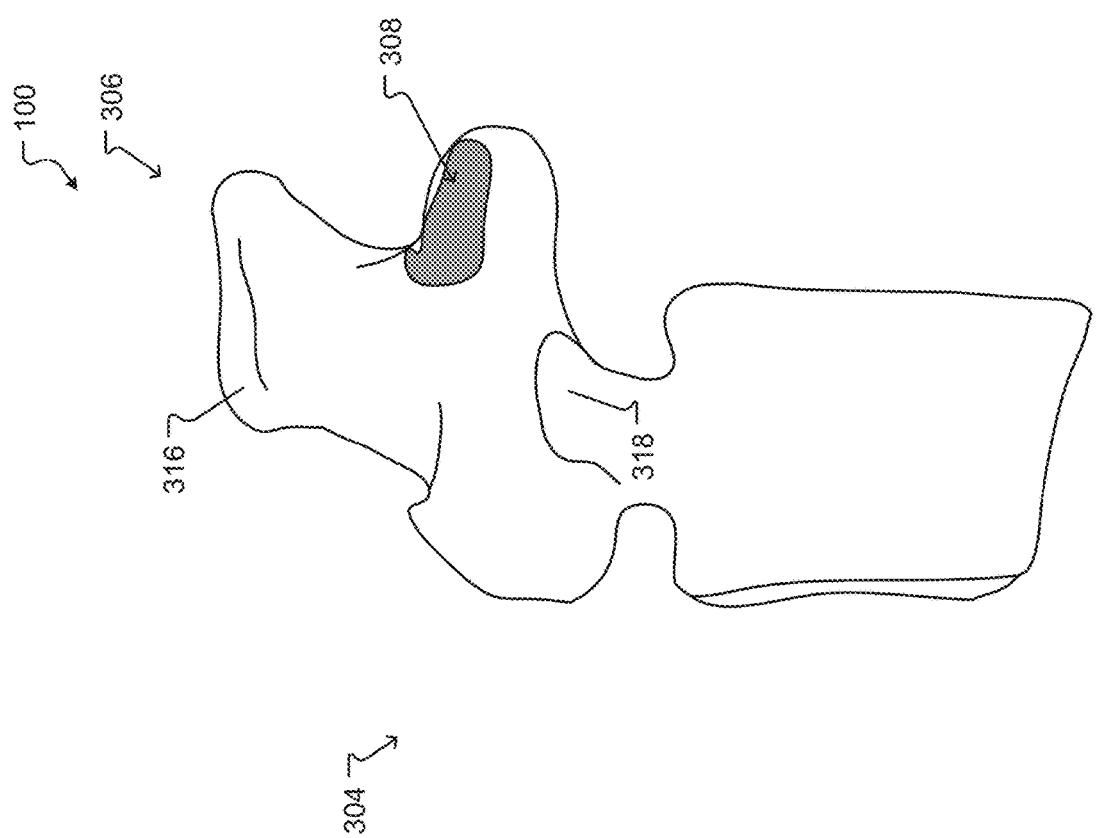
FIG. 3A is a diagram of a region of an anatomical element eligible for a bone graft according to at least one embodiment of the present disclosure.
Figure 3B:
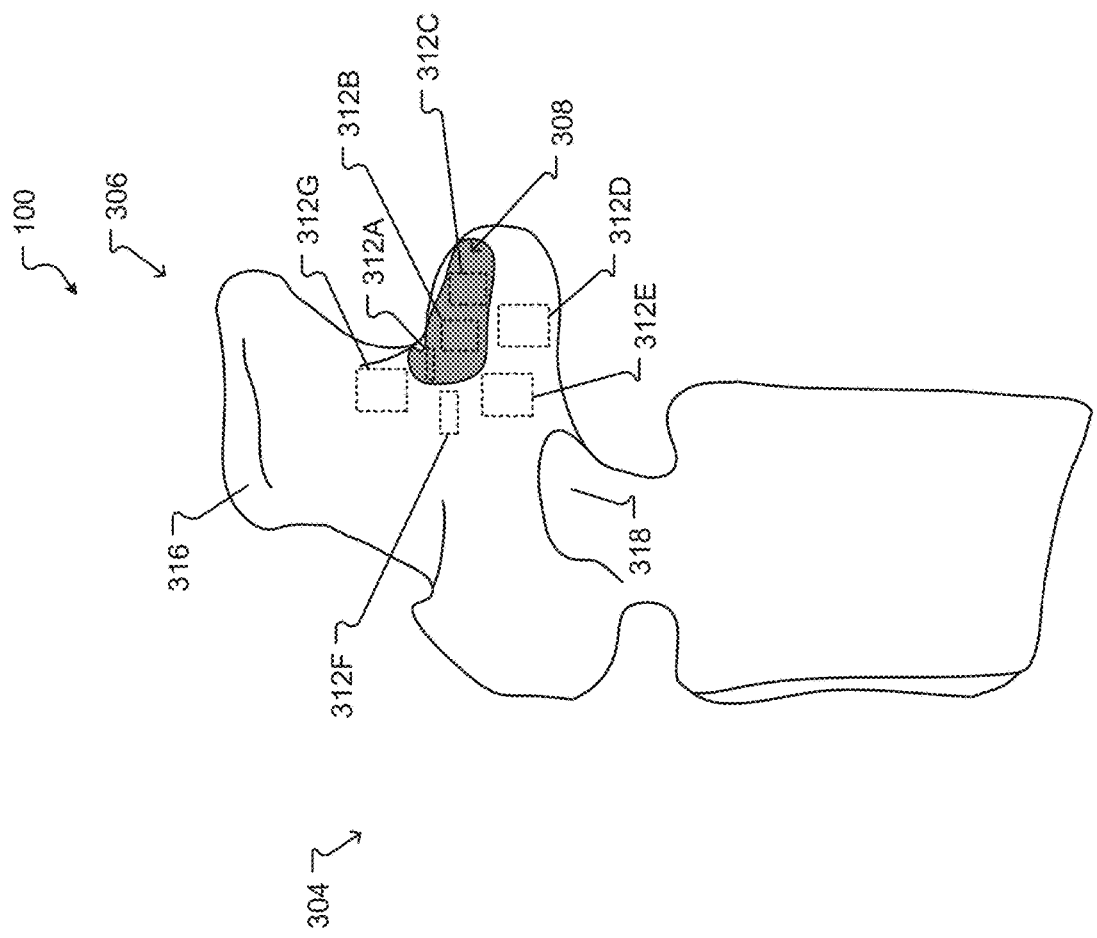
FIG. 3B is a diagram of the region of the anatomical element eligible for the bone graft segmented into a plurality of voxels according to at least one embodiment of the present disclosure.
Figure 3C:
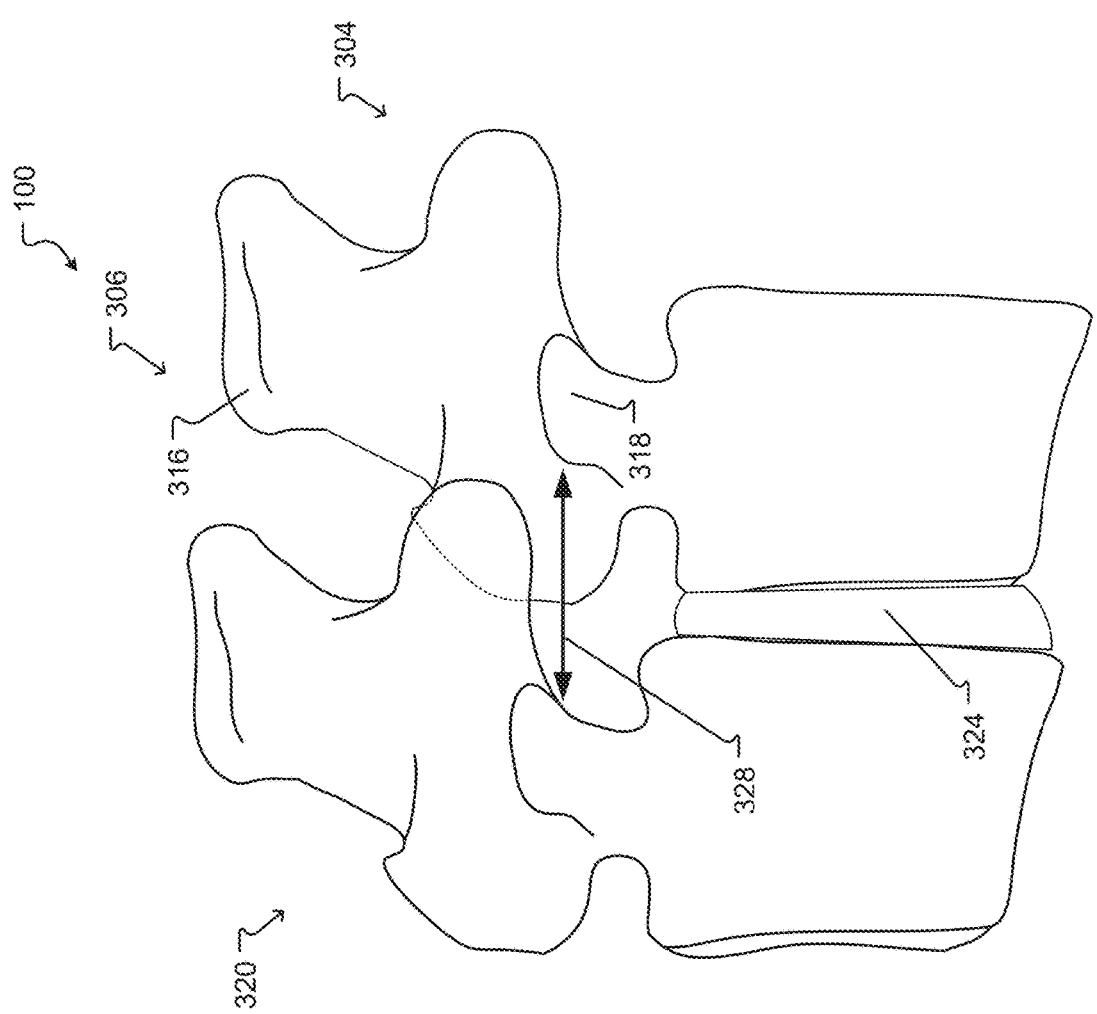
FIG. 3C is a diagram of anatomical elements according to at least one embodiment of the present disclosure.

FIGS. 3A-3C illustrate a region of an anatomical element eligible for a bone graft according to at least one embodiment of the present disclosure. FIG. 3A depicts a lateral view 306 of a vertebra 304, which may be eligible for a bone graft.

In some embodiments, the vertebra 304 may be similar to the vertebra 204. For example, the vertebra 304 comprises a spinous process 316 and a transverse process 318. The vertebra 304 includes an eligible portion 308 that is capable of receiving a bone graft. It is to be understood that, while the eligible portion 308 is illustrated as being proximate a lamina of the vertebra 304, the eligible portion 308 may be in additional or alternative locations of the vertebra 304. For example, the eligible portion 308 may be located on one or more endplates of the vertebra 304, on one or more facet joints of the vertebra 304, on one or more transverse processes of the vertebra 304, on one or more laminae of the vertebra 304, within the intervertebral disc space 324 between the vertebra 304 and another vertebra 320 (as depicted in FIG. 3C), within the intertransverse space 328 between the vertebra 304 and the vertebra 320, within the facet joint space between the vertebra 304 and the vertebra 320, within the interlaminar space between the vertebra 304 and the vertebra 320, combinations thereof, and/or the like. In some cases, the possible location for decortication and bone graft placement may depend on the type of procedure.

One or more images of the vertebra 304 (e.g., an image depicting the lateral view 306) may be captured and segmented into a second set of voxels 312A-312N. In some embodiments, the segmenting may be performed manually, with the user providing input (e.g., via the user interface 110) to create the second set of voxels 312A-312N. Additionally or alternatively, the segmenting may be performed by the processor 104 using, for example, segmentation 122. The segmentation 122 may comprise one or more AI and/or ML data models (e.g., CNNs, DNNs, etc.) trained on data sets to segment the image of the vertebra 304 into the second set of voxels 312A-312N. For example, the segmentation 122 data model(s) may be trained on historical data sets of similar anatomical elements and/or similar surgeries or surgical procedures to identify one or more regions of interest (e.g., the eligible portion 308 and/or areas proximate to the eligible portion 308) and superimpose the second set of voxels 312A-312N on the image of the vertebra 304. In some embodiments, the segmentation 122 may be semiautomatic, with the user capable of modifying the results of the segmentation 122 manually. In other words, the segmentation 122 may segment the image of the vertebra 304 and output the segmented image from the data model, and the user may be able to adjust the segments, the position of one or more voxels of the second set of voxels 312A-312N, combinations thereof, and the like manually via input into the user interface 110.

In some embodiments, the segmentation 122 may comprise labeling each voxel of the second set of voxels 312A-312N as either eligible for graft or not eligible for graft. For example, voxels representing portions of the vertebra 304 within the disc space of the vertebra 304 (e.g., proximate the intervertebral disc) and/or within a predetermined distance from posterior surfaces of one or more facets may be labeled as eligible for graft. Voxels representing portions of the vertebra 304 outside the predetermined distance from posterior surfaces of the facets, voxels corresponding to soft tissues on the surgical approach, and the like may be labeled as ineligible for bone graft. For example, the first voxel 312A, the second voxel 312B, and the third voxel 312C may be labeled as eligible for receiving the graft, while the remaining voxels 312D-312N may be labeled as ineligible for bone graft.

The computing device 102 may determine, based on the tracking and navigation of the surgical tool 136 by the navigation system 118, which voxels of the second set of voxels 312A-312N were occupied by the tool tip 236 when the surgical tool 136 interacts with the vertebra 304. The vertebra 304 may receive the bone graft, for example, during a spinal fusion surgery after the vertebra 304 has been decorticated. The eligible portion 308 may be decorticated, where a portion of the eligible portion 308 is removed to, for example, create a bleeding bony surface next to which the bone graft can be placed to stimulate the healing response. The computing device 102 may determine, for example, that a first voxel 312A, a second voxel 312B, and a third voxel 312C were occupied by the tool tip 236. Additionally or alternatively, the computing device 102 may identify voxels of the second set of voxels 312A-312N that were not occupied by or did not otherwise interact with the tool tip 236. For example, the computing device 102 may determine that a fourth voxel 312D, a fifth voxel 312E, a sixth voxel 312F, and a seventh voxel 312G did not interact with the tool tip 236.

The computing device 102 may determine which voxels of the voxels occupied by the tool tip 236 and labeled as eligible for the bone graft should be added to the total volume of graft needed. In other words, during the decortication of the vertebra 304, some volume of the vertebra 304 may be lost and may be replaced by the bone graft. The lost volume may be determined based on the sum of voxels that interacted with the tool tip 236. The determination of the total volume may depend on the type of surgical tool 136 that was used and tracked by the navigation system 118. For example, when the surgical tool 136 comprises a tool such as a surgical drill or other tool that removes bone, the computing device 102 may count the volume of the voxels through which the tool tip 236 passes toward the total volume of bone graft required. As another example, when the surgical tool 136 comprises a pull curette to remove disc material, the computing device 102 may count the volume of the voxels that interact with the tool tip 236 (which may be or comprise a cupped working end) toward the total required bone graft volume, while voxels that interact with the shaft of the curette are not counted toward the total required bone graft volume. In some embodiments, the computing device 102 may count voxels identified as eligible for bone graft, while not counting voxels identified as not eligible for bone graft. For example, the computing device 102 may not count voxels that are not within the eligible portion 308 when determining the total required bone graft volume.

In some embodiments, the computing device 102 may receive an image captured after the vertebra 304 has been decorticated, and may use the captured image to determine an amount of total bone graft required for a surgical task. For example, the imaging device 112 may capture an image of the vertebra 304 after the tool tip 236 has interacted with the vertebra 304. The computing device 102 may then use comparison 128 to compare the shape of the vertebra 304 (e.g., a border, an outline, etc.) before the surgical tool 136 has operated on the vertebra 304 with the shape of the vertebra 304 after the surgical tool 136 has operated on the vertebra 304. The comparison 128 may include registering or otherwise overlaying the images of the vertebra 304 and determining voxels associated with the volume of eligible portion 308 removed by the surgical tool 136. In some embodiments, the comparison 128 may be performed manually, with the providing input (e.g., via the user interface 110) to identify the portion of the vertebra 304 that has been removed by the surgical tool 136. Additionally or alternatively, the segmenting may be performed by the processor 104 using one or more AI and/or ML data models. For example, the processor 104 may access one or more data models (e.g., CNNs, DNNs, etc.) trained on data sets to compare the images of the vertebra 304 and identify the volume of the eligible portion 308 removed by the surgical tool 136. The one or more data models may be trained on historical data sets of similar anatomical elements and/or similar surgeries or surgical procedures. In some embodiments, the comparison may be semiautomatic, with the user capable of modifying the results of the comparison 128 manually. Stated differently, the comparison 128 may identify the volume of the eligible portion 308 removed by the surgical tool 136, and the user may be able to adjust the volume determination manually via input into the user interface 110.

The computing device 102 may determine a total amount bone graft required by summing the voxels values of the voxels within the eligible portion 308 identified as having been removed by the surgical tool 136. Each voxel identified as being removed may have a corresponding volume value associated therewith, and the sum of the corresponding voxels may correspond to the total volume of the bone graft required to supplant the missing anatomical material. In some embodiments, the computing device 102 may determine a fraction or percentage of the total determined amount of bone graft required as an actual amount required to perform the procedure. The fraction or percentage of the total volume may account for potential errors in segmenting, volume estimation, tracking, and the like. In other embodiments, the computing device 102 may scale the total amount of bone graft required by a factor (e.g., multiplying the volume by 1.1, 1.2, 1.5, 2, etc.) to account for account for the aforementioned errors. In some embodiments, the fraction, percentage, or scaling factor may be based on information retrieved from the database 130, and may include information about surgeon preference, information about relative autograft harvests in other clinical or surgical context (e.g., research on bone loss quantities during decortication), combinations thereof, and the like.

In some embodiments, information from the computing device 102 about which voxels correspond to regions of the vertebra 304 that have interacted with the tool tip 236, which voxels comprise material eligible for bone graft, and/or the total volume of bone graft required to carry out a surgical task may be rendered to a display such as the user interface 110 for the user (e.g., the surgeon) to see. The information may be used in determining an optimal bone graft mixture to use in a surgical procedure, as discussed in further detail below.

Once the computing device 102 has determined the available autograft and the total volume of bone graft required to perform a surgical task, the computing device 102 may determine a quantity of biologic (e.g., cortical bone, cancellous bone, bone marrow, other additives, etc.) required to perform the surgical task and/or an amount of additional bone that should be harvested (e.g., from other surgical sites such as the iliac crest of a vertebra). The amount of autograft available may be compared to the total volume of the bone graft required to perform the surgical task and, when the amount of autograft available is less than the total volume of the bone graft required to perform the surgical task, the computing device 102 may instruct the user (e.g., the surgeon) to perform additional collection of autograft.

The computing device 102 may provide, based on the available autograft and the total volume of bone graft required to perform a surgical task, a bone graft mixture to be used in the surgery or surgical procedure. For example, the recommended bone graft mixture may comprise the harvested autograft (which may include cortical bone, cancellous/trabecular bone, bone marrow, combinations thereof, and/or the like) as well as a synthetic bone graft (e.g., in a 40:60 mixture, in a 50:50 mixture, in a 60:40 mixture, etc.). In another example, the recommended bone graft mixture may comprise the harvested autograft as well as a demineralized bone matrix (DBM) (e.g., decalcified cortical bone) in a 50:50 mixture or a 40:60 mixture. In yet another example, the recommended bone graft mixture may comprise 15 mL of the harvested autograft or 10 mL of autogenous iliac bone graft (AIBG) with 5 mL of DBM. In yet another example, the recommended bone graft mixture may comprise recombinant human bone morphogenetic protein-2 (rhBMP-2) in a dosage recommendation (e.g., 1 mg, 2 mg, etc.) based on the volume required to perform the surgical task. In some embodiments, radiopaque markers may be added to the bone graft mixture, such that an image of the bone graft mixture can be captured after grafting. The radiopaque nature of the bone graft may enable the user to confirm the placement of the bone graft. The recommended bone graft mixture may be overridden by surgeon preference. For example, the surgeon may be able to interact via the user interface 110 to accept, alter, or decline to use the recommended bone graft mixture provided by the computing device 102.

In some embodiments, the recommended bone graft mixture may depend on the type of surgery or surgical procedure, surgeon preference, one or more patient parameters (e.g., patient morbidity), combinations thereof, and the like. For example, for an anterior lumbar interbody fusion (ALIF), the computing device 102 may recommended anywhere between 5 and 15 cubic centimeters (cc) of graft volume, while for a posterior lumbar interbody fusion (PLIF), the computing device 102 may recommend anywhere between 5 and 10 cc of graft volume. As another example, the user preference (e.g., the user generally uses 10 cc in a transforaminal lumbar interbody fusion (TLIF) procedure) may be stored in the database 130 and accessed by the computing device 102 when generating the recommended bone graft mixture.

In some embodiments, the recommended bone graft mixture may depend on the amount of cancellous and cortical bone harvested during the interaction between the surgical tool 136 and the vertebra 204, and/or the proportion of cortical bone to cancellous bone available. For example, when a greater amount of cortical bone is harvested than cancellous/trabecular bone, the computing device 102 may recommend a more potent, a more active, and/or a greater amount of biologics due to, for example, the reduced amount of cells in the cortical bone as compared to cancellous bone. The computing device 102 may recommend a bone graft mixture that matches the estimated bone density at the eligible portion 308 (e.g., based on the attenuation values of the voxels at the eligible portion 308). In other words, the computing device 102 may recommend a bone graft mixture with a greater concentration of cancellous bone when the computing device 102 determines that the voxel values associated with the eligible portion 308 are above a threshold value, indicating that the eligible portion 308 contains a greater concentration of cancellous bone. In some embodiments, the computing device 102 may provide information related to the percentage of cancellous and/or cortical bone harvested to the user (e.g., via the user interface 110).

The quantity of the recommended bone graft mixture may be based on a variety of factors, such as the amount of cancellous/trabecular and/or cortical bone harvested, the type of surgery or surgical procedure, surgeon preference, one or more patient parameters (e.g., patient morbidity), combinations thereof, and/or the like. In one embodiment, the quantity of the recommended bone graft mixture is determined based on the difference between the total bone volume of the bone graft needed to complete the surgery or surgical procedure (e.g., needed to treat the patient) and the volume of the harvested autograft from the patient. For example, if 15 cc of graft volume is required for the surgical procedure and the harvested autograft yields 10 cc of material, the quantity of the recommended bone graft mixture may be 5 cc.

Figure 4:
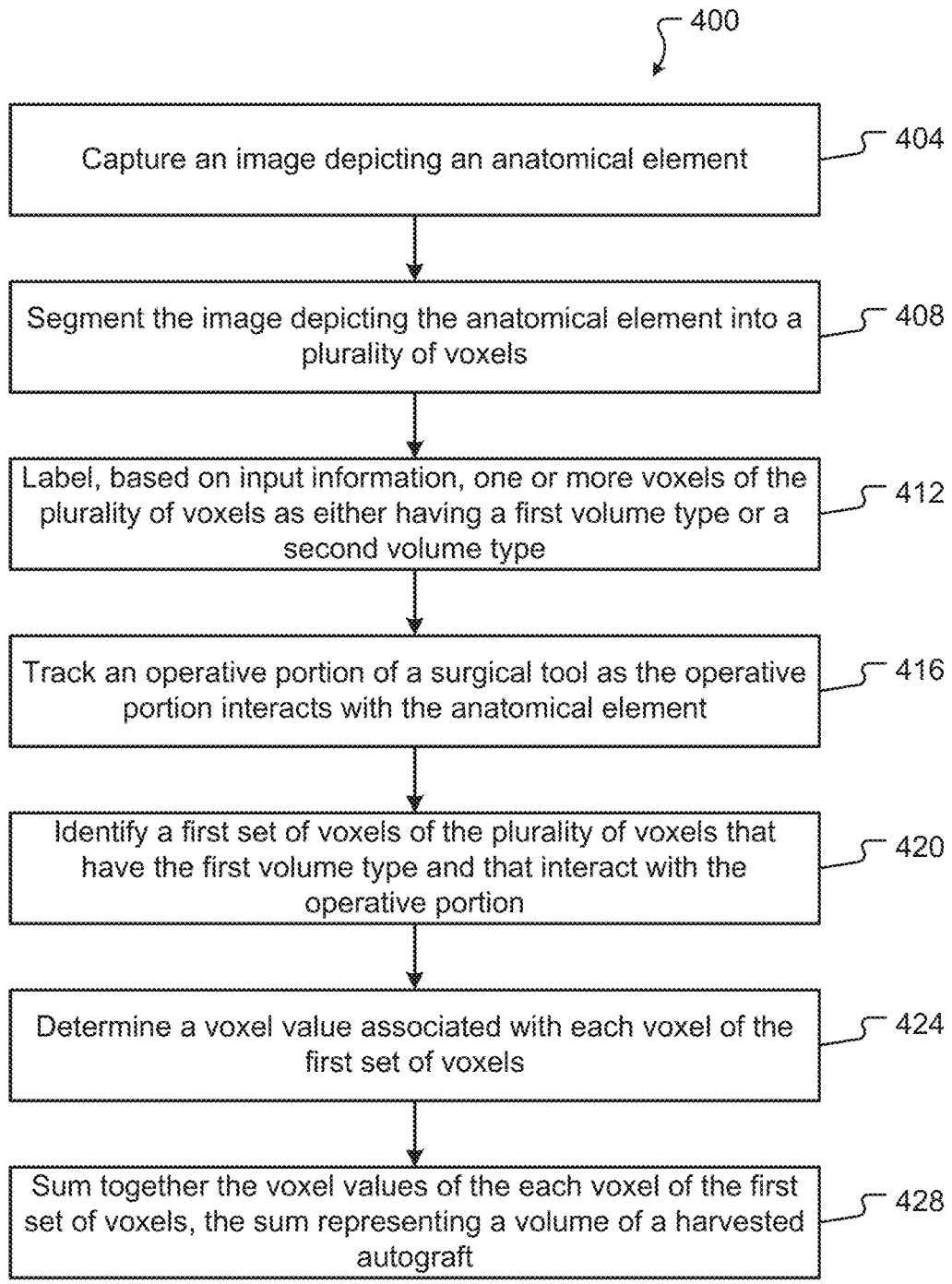
FIG. 4 is a flowchart according to at least one embodiment of the present disclosure.

FIG. 4 depicts a method 400 that may be used, for example, to determine a total amount of a harvested autograft.

The method 400 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform the method 400 by executing elements stored in a memory such as the memory 106. The elements stored in memory and executed by the processor may cause the processor to execute one or more steps of a function as shown in method 400. One or more portions of a method 400 may be performed by the processor executing any of the contents of memory, such as an image processing 120, a segmentation 122, a transformation 124, and/or a comparison 128.

The method 400 comprises capturing an image depicting an anatomical element (step 404). The image may be captured by the imaging device 112, and may depict the anatomical element that may be similar to or the same as the vertebra 204. In some embodiments, the image may depict additional anatomical elements, such as vertebrae adjacent to the imaging device 112. In some embodiments, the image may be captured during the course of a spinal fusion surgical procedure.

The method 400 also comprises segmenting the image depicting the anatomical element into a plurality of voxels (step 408). The plurality of voxels may be similar to or the same as the first set of voxels 244A-244N. The segmenting may be performed by the processor 104 using, for example, segmentation 122. The segmentation 122 may comprise one or more data models (e.g., CNNs, DNNs, etc.) trained on data sets to segment an image of the vertebra 204 into the first set of voxels 244A-244N. For example, the segmentation 122 data model(s) may be trained on historical data sets of similar anatomical elements and/or similar surgeries or surgical procedures to identify one or more regions of interest and superimpose the first set of voxels 244A-244N on the image of the vertebra 204. In some embodiments, the segmentation 122 may be semiautomatic, with the user capable of modifying the results of the segmentation 122 manually. In other words, the segmentation 122 may segment the image of the vertebra 204, and the user may be able to adjust the segments, the position of one or more voxels of the second set of voxels 312A-312N, combinations thereof, and the like manually via input into the user interface 110.

The method 400 also comprises labeling, based on input information, one or more voxels of the plurality of voxels as either having a first volume type or a second volume type (step 412). The labeling of the plurality of voxels may be based on relative intensity of attenuation value of each voxel (e.g., based on HU). In some embodiments, voxels that correspond to areas of the vertebra 204 that have a high percentage of cortical bone may be labeled with a first bone volume label indicating that the voxel has the first volume type, while voxels that correspond to areas of the vertebra 204 that have a low percentage of cortical bone (and/or that have a high percentage of cancellous/trabecular bone) may be labeled with a second bone volume label indicating that the voxel has the second volume type. The percentage may be based on a threshold value (e.g., 50%, 60%, 70%, 80%, 90%, 95%, etc.), with voxels corresponding to areas that have a percentage of cortical bone above the threshold value being labeled as having the first volume type. In other embodiments, voxels that correspond to areas of the vertebra 204 that have more cortical bone than cancellous/trabecular bone may be labeled as having the first volume type. In other words, voxels that correspond to areas of the vertebra 204 that have more than fifty percent cortical bone may be labeled as having the first volume type, while voxels that correspond to areas of the vertebra 204 that have more than fifty percent cancellous/trabecular bone may be labeled as having the second volume type. In some embodiments, the percentage of cortical bone within a voxel may be determined based on results from the segmentation 122, based on information from the database 130, based on user input, combinations thereof, and the like.

In some embodiments, the first bone volume label may indicate a low bone quality and the second bone volume label may indicate a high bone quality, from a bone grafting perspective. In other words, cancellous bone is of higher bone quality compared to cortical bone for the purposes of bone grafting (e.g., due to increased biologics in the cancellous bone as compared to the cortical bone). As a result, in some cases different bone graft mixtures may be recommended based on the proportion of the number of first bone volume labels compared to the number of second bone volume labels. For example, when there are more first bone volume labels than second bone volume labels, the harvested autograft may have a greater amount of cortical bone than cancellous bone, and a more potent or active biologic may be recommended to help facilitate bone growth, as discussed in further detail below.

The method 400 also comprises tracking an operative portion of a surgical tool as the operative portion interacts with the anatomical element (step 416). The surgical tool may be similar to or the same as the surgical tool 136. The tracking may be performed by the navigation system 118 tracking the surgical tool 136 (and/or the tool tip 236 of the surgical tool 136) using one or more navigation markers attached to the surgical tool 136. In such cases, the navigation system 118 may receive image data from the imaging device 112 that images the navigation markers on the surgical tool 136, and the navigation system 118 may use the processor 104 to determine the pose of the surgical tool 136 as well as changes thereto. Then, based on the movement of the surgical tool 136 relative to one or more localizers, the navigation system 118 may determine the movement of the surgical tool 136 relative to the vertebra 204.

The method 400 also comprises identifying a first set of voxels of the plurality of voxels that have the first volume type and that interact with the operative portion (step 420). The first set of voxels may comprise voxels that have been identified as having the first volume type and that have interacted with the operative portion (e.g., tool tip 236) of the surgical tool 136 when the surgical tool 136 interacts with the vertebra 204. In embodiments where the tool tip 236 is a surgical tip capable of resecting bone or other anatomical tissue, the step 420 may include identifying all voxels that have interacted with the operative portion of the surgical tool 136, and then identifying a subset of voxels that have the first volume type.

The method 400 also comprises determining a voxel value associated with each voxel of the first set of voxels (step 424). The voxel value may be or comprise attenuation values associated with each voxel. For example, the attenuation value may be represented in HU. The HU value may be determined using segmentation 122, such as when the segmentation 122 comprises a data model that segments the image of the vertebra 204 and defines the plurality of voxels. In this case, the segmentation 122 may assign an HU value to each voxel of the plurality of voxels.

The method 400 also comprises summing together the voxel values of the each voxel of the first set of voxels, the sum representing a volume of a harvested autograft (step 428). Once the voxel values of each voxel of the first set of voxels is determined, the voxel values may be summed to represent a total volume of the harvested autograft. In some embodiments, the volume of the harvested autograft may be rendered to a display (e.g., a user interface 110) and may be used to provide a recommended bone graft mixture.

The present disclosure encompasses embodiments of the method 400 that comprise more or fewer steps than those described above, and/or one or more steps that are different than the steps described above.

Figure 5:
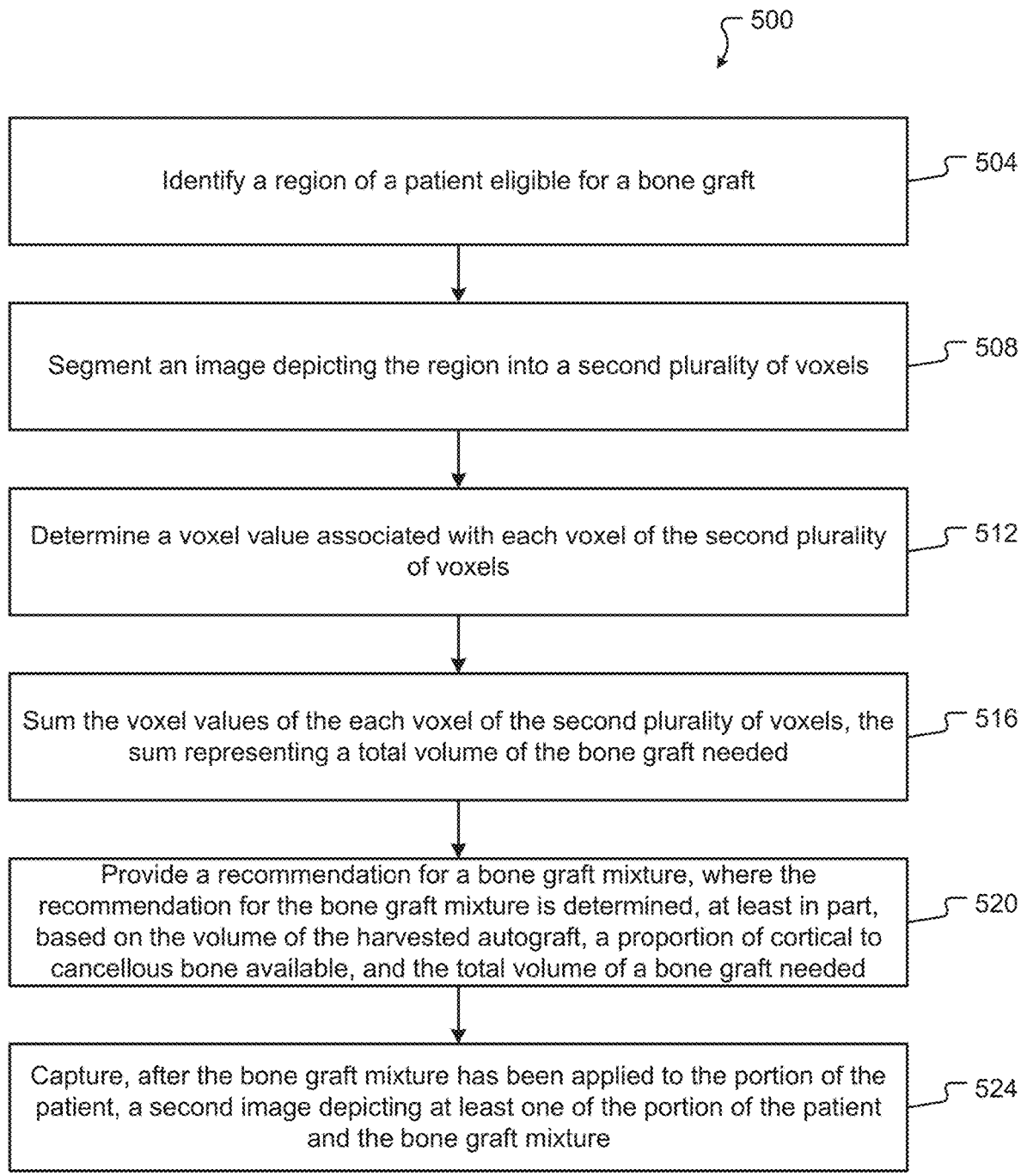
FIG. 5 is a flowchart according to at least one embodiment of the present disclosure.

FIG. 5 depicts a method 500 that may be used, for example, to determine an amount of bone graft for a surgical task and to provide a recommended bone graft mixture.

The method 500 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 500. The at least one processor may perform the method 500 by executing elements stored in a memory such as the memory 106. The elements stored in memory and executed by the processor may cause the processor to execute one or more steps of a function as shown in method 500. One or more portions of a method 500 may be performed by the processor executing any of the contents of memory, such as an image processing 120, a segmentation 122, a transformation 124, and/or a comparison 128.

The method 500 comprises identifying a region of a patient eligible for a bone graft (step 504). The region may be similar to or the same as the eligible portion 308 of the vertebra 304. In other words, the vertebra 304 may be the anatomical element to receive the bone graft, such as when the vertebra 304 is part of a spinal fusion surgical procedure. In some embodiments, the identifying may comprise capturing one or more images of the vertebra 304 and identifying, using segmenting 122, the eligible portion 308.

The method 500 also comprises segmenting an image depicting the region into a second plurality of voxels (step 508). The eligible portion 308 may be segmented into a second plurality of voxels, which may be similar to or the same as the second set of voxels 312A-312N. The segmenting of the image may be performed by the processor 104 using, for example, segmentation 122. The segmentation 122 may comprise one or more AI and/or ML data models (e.g., CNNs, DNNs, etc.) trained on data sets to segment the eligible portion 308 of the vertebra 304 into a second plurality of voxels. For example, the segmentation 122 data model(s) may be trained on historical data sets of similar anatomical elements and/or similar surgeries or surgical procedures to identify the eligible portion 308 and/or areas proximate to the eligible portion 308 and superimpose the second plurality of voxels on the image of the vertebra 304. In some embodiments, the segmentation 122 may be semi-automatic, with the user capable of modifying the results of the segmentation 122 manually. In other words, the segmentation 122 may segment the image of the vertebra 304, and the user may be able to adjust the segments, the position of one or more voxels of the second plurality of voxels, combinations thereof, and the like manually via input into the user interface 110.

The method 500 also comprises determining a voxel value associated with each voxel of the second plurality of voxels (step 512). In some embodiments, the step 512 may be similar to the step 424 of the method 400. In other words, the voxel value of each voxel of the second plurality of voxels may be or comprise attenuation values associated with each voxel. The attenuation value may be represented in HU. The HU value may be determined using segmentation 122, such as when the segmentation 122 comprises a data model that segments the image of the vertebra 204 and defines the second plurality of voxels. In this case, the segmentation 122 may assign an HU value to each voxel of the second plurality of voxels.

The method 500 also comprises summing the voxel values of the each voxel of the second plurality of voxels, the sum representing a total volume of the bone graft needed (step 516). In some embodiments, the step 516 may be similar to the step 424 of the method 400. In other words, once the voxel values of each voxel of the second plurality of voxels is determined, the voxel values may be summed to represent a total volume of the bone graft needed or required to perform a surgical task. In some embodiments, the volume of the bone graft may be rendered to a display (e.g., a user interface 110) and may be used to provide a recommended an auto graft mix.

The method 500 also comprises providing a recommendation for a bone graft mixture, where the recommendation for the bone graft mixture is determined, at least in part, based on the volume of the harvested autograft, a proportion of cortical to cancellous bone available, and the total volume of a bone graft needed (step 520). In some cases, the step 520 may consider the relative values associated with the volume of the harvested autograft, a proportion of cortical to cancellous bone available, and the total volume of the bone graft needed. For instance, when the total volume of the bone graft is greater than the volume of the harvested autograft, the recommendation may include additional biologic to supplement for the lack of harvested autograft. In other cases, if the proportion of the first volume type to the second volume type is high (e.g., greater than a predetermined threshold value stored in the database 130), then more biologic volume or a more active biologic may be recommended. Such recommendations may occur due to, for example, a greater amount of cortical bone than cancellous bone in the harvested autograft (as determined based on HU values). In some examples, the recommendation may include instructing the physician to gather additional autograft (e.g., by drilling additional material in the iliac crest of the vertebra 204 using the surgical tool 136). The recommendation may be based on the type of surgery or surgical procedure being performed, surgeon preference information, one or more patient parameters (e.g., patient morbidity) or other patient information, other medical information (e.g., growth factors, research on bone graft mixtures, etc.), other information (e.g., regulatory permissions), combinations thereof, and the like. The surgeon may be able to accept, modify, or decline to use the recommended bone graft mixture.

The method 500 also comprises capturing, after the bone graft mixture has been applied to the portion of the patient, a second image depicting at least one of the portion of the patient and the bone graft mixture (step 524). After the bone graft mixture has been applied (e.g., to the eligible portion 308), an image of the eligible portion 308 may be captured using, for example, the imaging device 112. The image may depict the eligible portion 308 and the bone graft mixture applied thereto, such as when the bone graft mixture comprises radiopaque material that enable the bone graft mixture to be depicted in the image. In some embodiments, the image may be captured intraoperatively, enabling users in the surgical environment (e.g., the surgeon, members of surgical staff, etc.) to analyze the position of the bone graft mixture relative to the eligible portion 308 and, if necessary, adjust or supplement the applied bone graft mixture.

The present disclosure encompasses embodiments of the method 500 that comprise more or fewer steps than those described above, and/or one or more steps that are different than the steps described above.

As noted above, the present disclosure encompasses methods with fewer than all of the steps identified in FIGS. 4 and 5 (and the corresponding description of the methods 400 and 500), as well as methods that include additional steps beyond those identified in FIGS. 4 and 5 (and the corresponding description of the methods 400 and 500). The present disclosure also encompasses methods that comprise one or more steps from one method described herein, and one or more steps from another method described herein. Any correlation described herein may be or comprise a registration or any other correlation.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The techniques of this disclosure may also be described in the following examples.

Example 1: A system (100), comprising:
a processor (104); and
a memory (106) storing data thereon that, when processed by the processor (104), enable the processor (104) to:
segment an image depicting an anatomical element (204) into a plurality of voxels (244A-244N); label, based on input information, one or more voxels of the plurality of voxels (244A-244N) as either having a first volume type or a second volume type;
track an operative portion (236) of a surgical tool (136) as the operative portion (236) interacts with the anatomical element (204);
identify a first set of voxels of the plurality of voxels (244A-244N) that have the first volume type and that interact with the operative portion (236);
determine a voxel value associated with each voxel of the first set of voxels; and sum together the voxel values of the each voxel of the first set of voxels, the sum representing a volume of a harvested autograft.

Example 2: The system according to example 1, wherein the data further enable the processor (104) to:
identify a region (308) of a patient eligible for a bone graft;
segment an image depicting the region (308) into a second plurality of voxels (312A-312N); determine a voxel value associated with each voxel of the second plurality of voxels (312A-312N); and
sum the voxel values of the each voxel of the second plurality of voxels (312A-312N), the sum representing a total volume of the bone graft.

Example 3: The system according to examples 1 or 2, wherein the data further enable the processor (104) to:
provide a recommendation for a bone graft mixture, wherein the recommendation for the bone graft mixture is determined, at least in part, based on the volume of the harvested autograft, a proportion of cortical to cancellous bone available, and the total volume of the bone graft.

Example 4: The system according to example 3, wherein a quantity of the recommended bone graft mixture is determined based on a difference between the total volume of the bone graft for the surgical task and the volume of the harvested autograft.

Example 5: The system according to any of examples 3 to 4, wherein the recommended bone graft mixture comprises one or more of cancellous bone, cortical bone, bone marrow, demineralized bone matrix (DBM), autogenous iliac bone graft (AIBG), recombinant human bone morphogenetic protein-2 (rhBMP-2), and synthetic bone graft.

Example 6: The system according to any of examples 3 to 5, wherein the recommended bone graft mixture is based on at least one of surgeon preference information retrieved from a database (130) and a parameter associated with the patient.

Example 7: The system according to any of examples 2 to 6, wherein the data further enable the processor (104) to:
capture, after a bone graft mixture has been applied to the portion (308) of the patient, a second image depicting the portion (308) of the patient.

Example 8: The system according to any of examples 2 to 7, wherein each voxel value of at least one of the first set of voxels and the second plurality of voxels (312A-312N) are determined based on Hounsfield units.

Example 9: The system according to any of examples 1 to 8, wherein the input information comprises at least one of an output of a machine learning model that labels the each voxel of the plurality of voxels (244A-244N) and a user input.

Example 10: The system according to example 9, wherein the machine learning model comprises a convolutional neural network.

Example 11: A method, comprising:
determining a volume of a harvested autograft, the determining comprising:
receiving an image depicting an anatomical element (204), the image segmented into a plurality of voxels (244A-244N) with each voxel of the plurality of voxels (244A-244N) labeled with either a first bone volume label representing a first volume type or a second bone volume label representing a second volume type; and
summing a first set of voxel values labeled as having the first volume type and through which an operative portion (236) of a navigated tool (136) passes to determine the volume of the harvested autograft; and
determining a total volume of a bone graft for a surgical task, the determining comprising:
identifying a portion (308) of a patient eligible for the bone graft; and
summing a second set of voxel values associated with the portion (308) of the patient to determine the total volume of the bone graft.

Example 12: The method according to example 11, wherein the operative portion (236) of the navigated tool (136) comprises a surgical tip capable of resecting anatomical tissue from the anatomical element (204), and wherein the determining the volume of the harvested autograft further comprises:
tracking a position of the surgical tip of the navigated tool (136).

Example 13: The method according to any of examples 11 to 12, further comprising:
displaying a recommendation for a bone graft mixture, wherein the recommendation for the bone graft mixture is determined, at least in part, based on the volume of the harvested autograft and the total volume of the bone graft.

Example 14: The method according to example 13 wherein a quantity of the recommended bone graft mixture is determined based on a difference between the total volume of the bone graft for the surgical task and the volume of the harvested autograft.

Example 15: A surgical system (100), comprising:
a surgical tool (136) with an operative portion (236) capable of resecting anatomical tissue;
a processor (104); and
a memory (106) storing data thereon that, when processed by the processor (104), enable the processor (104) to:
determine a volume of a harvested autograft of an anatomical element (204), the determining comprising:
segmenting a first image depicting the anatomical element (204) into a plurality of voxels (244A-244N);
labeling each voxel of the plurality of voxels (244A-244N) as either having a first volume type or a second volume type;
identifying a first set of voxels, wherein each voxel of the first set of voxels is labeled as having the first volume type and has been occupied by the operative portion (236) of the surgical tool (136); determining a volume of each voxel of the first set of voxels; and
summing the volume of each voxel of the first set of voxels together to determine the volume of the harvested autograft;

determine a total volume of a bone graft for a surgical task, the determining comprising: identifying, based on a second image of a patient, a region (308) of the patient eligible for the bone graft; and summing voxel values in the region (308) of the patient to determine the total volume of the bone graft needed; and display a recommendation for a bone graft mixture, wherein the recommendation for the bone graft mixture is determined, at least in part, based on a combination of the volume of the harvested autograft, a proportion of cortical to cancellous bone available, and the total volume of the bone graft needed.

Various examples of the disclosure have been described. These and other examples are within the scope of the following claims.

What is claimed is:

1. A method, comprising:
determining a volume of a harvested autograft, the determining comprising:
receiving an image depicting an anatomical element, the image segmented into a plurality of voxels with each voxel of the plurality of voxels labeled with either a first bone volume label representing a first volume type or a second bone volume label representing a second volume type; and
summing a first set of voxel values labeled as having the first volume type and through which an operative portion of a navigated tool passes to determine the volume of the harvested autograft; and
determining a total volume of a bone graft for a surgical task, the determining comprising:
identifying a portion of a patient eligible for the bone graft; and
summing a second set of voxel values associated with the portion of the patient to determine the total volume of the bone graft.

2. The method of claim 1, wherein the operative portion of the navigated tool comprises a surgical tip capable of resecting anatomical tissue from the anatomical element, and wherein the determining the volume of the harvested autograft further comprises:
tracking a position of the surgical tip of the navigated tool.

3. The method of claim 1, further comprising:
displaying a recommendation for a bone graft mixture, wherein the recommendation for the bone graft mixture is determined, at least in part, based on the volume of the harvested autograft and the total volume of the bone graft.

4. The method of claim 3, wherein the bone graft mixture comprises one or more of cancellous bone, cortical bone, bone marrow, demineralized bone matrix (DBM), autogenous iliac bone graft (AIBG), recombinant human bone morphogenetic protein-2 (rhBMP-2), and synthetic bone graft.

5. The method of claim 4, wherein the bone graft mixture is determined based at least partially on a surgeon preference and an estimated match to bone density at the portion of the patient eligible for the bone graft.

6. The method of claim 3, wherein a quantity of the recommended bone graft mixture is determined based on a difference between the total volume of the bone graft for the surgical task and the volume of the harvested autograft.

7. The method of claim 1, further comprising:
capturing, after a bone graft mixture has been applied to the portion of the patient, a second image depicting at least one of the portion of the patient and the bone graft mixture.

8. The method of claim 1, wherein voxels of the plurality of voxels that comprise more than fifty percent cancellous bone are labeled as having high bone quality, and wherein voxels of the plurality of voxels that comprise more than fifty percent cortical bone are labeled as having low bone quality.

9. The method of claim 1, wherein at least one of the first set of voxel values and the second set of voxel values is determined based on Hounsfield units.

10. The method of claim 1, wherein a machine learning model at least one of segments the image and labels the voxels.

11. The method of claim 1, wherein the determining the total volume of the bone graft further comprises:
segmenting a second image depicting the portion of the patient into a second plurality of voxels, wherein each voxel value of the second set of voxel values corresponds to a respective voxel of the second plurality of voxels.

12. A system, comprising:
a processor; and
a memory storing data thereon that, when processed by the processor, enable the processor to:
segment an image depicting an anatomical element into a plurality of voxels;
label, based on input information, one or more voxels of the plurality of voxels as either having a first volume type or a second volume type;
track an operative portion of a surgical tool as the operative portion interacts with the anatomical element;
identify a first set of voxels of the plurality of voxels that have the first volume type and that interact with the operative portion;
determine a voxel value associated with each voxel of the first set of voxels; and
sum together the voxel values of the each voxel of the first set of voxels, the sum representing a volume of a harvested autograft.

13. The system of claim 12, wherein the data further enable the processor to:
identify a region of a patient eligible for a bone graft;
segment an image depicting the region into a second plurality of voxels;
determine a voxel value associated with each voxel of the second plurality of voxels; and
sum the voxel values of the each voxel of the second plurality of voxels, the sum representing a total volume of the bone graft.

14. The system of claim 13, wherein the data further enable the processor to:
provide a recommendation for a bone graft mixture, wherein the recommendation for the bone graft mixture is determined, at least in part, based on the volume of the harvested autograft, a proportion of cortical to cancellous bone available, and the total volume of the bone graft.

15. The system of claim 14, wherein the recommended bone graft mixture comprises one or more of cancellous bone, cortical bone, bone marrow, demineralized bone matrix (DBM), autogenous iliac bone graft (AIBG), recombinant human bone morphogenetic protein-2 (rhBMP-2), and synthetic bone graft.

16. The system of claim 13, wherein the data further enable the processor to:

capture, after a bone graft mixture has been applied to the portion of the patient, a second image depicting the portion of the patient.

17. The system of claim 13, wherein each voxel value of at least one of the first set of voxels and the second plurality of voxels are determined based on Hounsfield units.

18. The system of claim 14, wherein the recommended bone graft mixture is based on at least one of surgeon preference information retrieved from a database and a parameter associated with the patient.

19. The system of claim 14, wherein a quantity of the recommended bone graft mixture is determined based on a difference between the total volume of the bone graft for a surgical task and the volume of the harvested autograft.

20. The system of claim 12, wherein the input information comprises at least one of an output of a machine learning model that labels the each voxel of the plurality of voxels and a user input.

21. The system of claim 20, wherein the machine learning model comprises a convolutional neural network.

22. A surgical system, comprising:

a surgical tool with an operative portion capable of resecting anatomical tissue;

a processor; and a memory storing data thereon that, when processed by the processor, enable the processor to:

determine a volume of a harvested autograft of an anatomical element, the determining comprising:

segmenting a first image depicting the anatomical element into a plurality of voxels;

labeling each voxel of the plurality of voxels as either having a first volume type or a second volume type;

identifying a first set of voxels, wherein each voxel of the first set of voxels is labeled as having the first volume type and has been occupied by the operative portion of the surgical tool;

determining a volume of each voxel of the first set of voxels; and summing the volume of each voxel of the first set of voxels together to determine the volume of the harvested autograft;

determine a total volume of a bone graft for a surgical task, the determining comprising:

identifying, based on a second image of a patient, a region of the patient eligible for the bone graft; and summing voxel values in the region of the patient to determine the total volume of the bone graft needed; and display a recommendation for a bone graft mixture, wherein the recommendation for the bone graft mixture is determined, at least in part, based on a combination of the volume of the harvested autograft, a proportion of cortical to cancellous bone available, and the total volume of the bone graft needed.

23. The surgical system of claim 22, wherein a quantity of the recommended bone graft mixture is determined based on a difference between the total volume of the bone graft needed and the volume of the harvested autograft.

* * * * *